(12) United States Patent
Zhang

(10) Patent No.: US 12,010,760 B2
(45) Date of Patent: Jun. 11, 2024

(54) SERVICE-BASED COMMUNICATION METHOD, UNIT, AND SYSTEM, AND STORAGE MEDIUM

(71) Applicant: Tencent Technology (Shenzhen) Company Limited, Shenzhen (CN)

(72) Inventor: Yunfei Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 357 days.

(21) Appl. No.: 17/228,633

(22) Filed: Apr. 12, 2021

(65) Prior Publication Data

US 2021/0235260 A1 Jul. 29, 2021

Related U.S. Application Data

(63) Continuation of application No. PCT/CN2019/124308, filed on Dec. 10, 2019.

(30) Foreign Application Priority Data

Jan. 15, 2019 (CN) .......................... 201910036028.3

(51) Int. Cl.
*H04W 4/50* (2018.01)
*H04W 4/60* (2018.01)
(Continued)

(52) U.S. Cl.
CPC .............. *H04W 8/26* (2013.01); *H04W 4/50* (2018.02); *H04W 4/60* (2018.02); *H04W 48/16* (2013.01); *H04W 48/18* (2013.01)

(58) Field of Classification Search
CPC ........... H04W 8/26; H04W 4/50; H04W 4/60; H04W 48/16; H04W 48/18;
(Continued)

(56) References Cited

U.S. PATENT DOCUMENTS 8,244,179 B2 * 8/2012 Dua ........................ H04W 4/80
455/2.01
11,844,014 B2 * 12/2023 S Bykampadi ......... H04L 67/63
(Continued)

FOREIGN PATENT DOCUMENTS

CH 621031 B * 7/1981 ............. D06B 17/06
CN 102185728 A 9/2011
(Continued)

OTHER PUBLICATIONS

Anonymous, "3rd Generation Partnership Project; Technical Specification Group Services and System Aspects; System Architecture for the 5G System; Stage 2 (Release 15)", 3GPP Standard; Technical Specification; 3GPP 3rd Generation Partnership Project (3GPP), Mobile Competence Centre, France, vol. SA WG2, No. V15.4.0, Dec. 18, 2018, XP051591141, 236 pgs.
(Continued)

*Primary Examiner* — Julio R Perez
(74) *Attorney, Agent, or Firm* — Morgan, Lewis & Bockius LLP

(57) ABSTRACT

Embodiments of this application disclose a service-based communication method, unit, and system, and a storage medium, to support a service framework of hybrid communication, thereby improving the service efficiency and flexibility of framework deployment. One method includes: obtaining a target communication address, the target communication address being a communication address corresponding to a service provided by a first destination service unit that needs to be accessed; transmitting a first service access request to the target communication address, the first service access request including a service type of the first destination service unit; and receiving a service access response from the target communication address.

20 Claims, 12 Drawing Sheets

(51) Int. Cl.
*H04W 8/26* (2009.01)
*H04W 48/16* (2009.01)
*H04W 48/18* (2009.01)

(58) Field of Classification Search
CPC . H04L 61/4541; H04L 67/51; H04L 67/1004; H04L 67/1023; H04L 67/60
See application file for complete search history.

(56) References Cited

U.S. PATENT DOCUMENTS

| | | |
|---|---|---|
| 2004/0024912 A1 | 2/2004 | Fukao et al. |
| 2014/0176981 A1* | 6/2014 | Asai .................. H04N 1/00204 358/1.13 |
| 2015/0074249 A1 | 3/2015 | Connelly et al. |
| 2016/0127207 A1* | 5/2016 | Zaccaria ............ G05B 19/0428 709/224 |
| 2017/0126535 A1* | 5/2017 | Ameixieira ........... H04L 5/0037 |
| 2018/0007178 A1* | 1/2018 | Subhraveti .............. G06F 9/541 |
| 2018/0152745 A1 | 5/2018 | Bolin |

FOREIGN PATENT DOCUMENTS

| | | |
|---|---|---|
| CN | 109639829 A | 4/2019 |
| CN | 110169140 A | 8/2019 |
| JP | H 11167535 A | 6/1999 |
| JP | 2016129351 A | 7/2016 |
| JP | 2016154278 A | 8/2016 |

OTHER PUBLICATIONS

Extended European Search Report, EP19910698.0, dated Feb. 8, 2022.
ZTE, "Clarification on Target Address in Service Request Message", 3GPP Draft; S2-1908820, 501 Service Request, 3rd Generation Partnership Project (3GPP), Mobile Competence Centre, vol. SA WG2, No. Split, Croatia, Oct. 11, 2019, XP051801050, 3 pgs.
Tencent Technology, JP Office Action, Japanese Patent Application No. 2021-538217, dated Aug. 2, 2022, 13 pgs.
3GPP TR 23.742 V16.0.0, "3rd Generation Partnership Project; Technical Specification Group Services and System Aspects; Study on Enhancements to the Service-Based Architecture (Release 16)", Technical Report, Dec. 2018, 24 pgs.
Tencent Technology, ISR, PCT/CN2019/124308, dated Mar. 9, 2020, 3 pgs.
ZTE, "Service Continuity for Prose Direct Communication R2-152559", GPP TSG-RAN WG2 Meeting #90, R2-152559, Fukuoka, Japan, May 25-29, 2015, 5 pgs.
Tencent Technology, WO, PCT/CN2019/124308, dated Mar. 9, 2020, 4 pgs.
Tencent Technology, IPRP, PCT/CN2019/124308, dated Jun. 16, 2021, 5 pgs.

\* cited by examiner

SERVICE-BASED COMMUNICATION METHOD, UNIT, AND SYSTEM, AND STORAGE MEDIUM

CROSS-REFERENCE TO RELATED APPLICATIONS

This application is a continuation application of PCT Patent Application No. PCT/CN2019/124308, entitled "SERVICE-BASED COMMUNICATION METHOD, COMMUNICATION UNIT, SERVICE SUPPORT UNIT, AND SYSTEM" filed on Dec. 10, 2019, which claims priority to Chinese Patent Application No. 201910036028.3, entitled "SERVICE-BASED COMMUNICATION METHOD, COMMUNICATION UNIT, SERVICE SUPPORT UNIT, AND SYSTEM" and filed on Jan. 15, 2019, both of which are incorporated herein by reference in their entirety.

FIELD OF THE TECHNOLOGY

This application relates to the field of computer technologies, and in particular, to a service-based communication method, unit, and system, and a storage medium.

BACKGROUND OF THE DISCLOSURE

In a fifth generation (5G) mobile communication technology core network architecture in release 15 (R15), all interfaces between various network function (NF) entities inside a control plane are designed by using a service interface-based design method, and internal communication is implemented in a service invocation manner. Under such a service-based architecture (SBA), a conventional invocation manner between network elements is transformed into an invocation between services of various NF entities.

In a 5G core network architecture in release 16 (R16), a project of enhancements to the service-based architecture (eSBA) is provided, and a concept of a service framework is further explicitly provided. The service framework refers to a set of other functions than service logic in the SBA.

The eSBA project of the 5G system provides different deployment manners. Each deployment manner has specific requirements of the deployment manner for a communication manner of a service, that is, direct communication or indirect communication. All services in the SBA can be implemented based on only one of the foregoing two communication manners. This imposes certain constraints on the deployment of the SBA. Once the setting of each deployment manner is completed, only a communication manner supported by the deployment manner can be used to provide a service, and the design of various services of different communication manners cannot be flexibly supported, reducing the efficiency and flexibility of providing services by the SBA.

SUMMARY

Embodiments of this application provide a service-based communication method, unit, and system, and a storage medium, to support a service framework of hybrid communication, thereby improving the service efficiency and flexibility of framework deployment.

The embodiments of this application provide the following technical solutions:

According to an aspect, the embodiments of this application provide a service-based communication method performed at a computing device acting as a first communication unit, the method including:
  obtaining, by the first communication unit, a target communication address, the target communication address being a communication address corresponding to a service provided by a first destination service unit that needs to be accessed, the target communication address being provided by a network repository function unit according to a communication manner used by the first destination service unit, when the first destination service unit is a first service unit using an indirect communication manner, a first communication address being a communication address of a first service support unit that provides a service to the first service unit, and when the first destination service unit is a second service unit using a direct communication manner, the first communication address being a communication address of the second service unit;
  transmitting, by the first communication unit, a first service access request to the target communication address, the first service access request including a service type of the first destination service unit; and
  receiving, by the first communication unit, a service access response from the target communication address, the service access response being generated after the first destination service unit provides the service.

According to another aspect, the embodiments of this application further provide a service-based communication method performed at a computing device acting as a first communication unit, the method including:
  receiving, by the first service support unit, a first service access request transmitted by a first communication unit to a target communication address, the first service access request including a service type of a first service unit that needs to be accessed, the first service support unit being a service support unit that provides a service to the first service unit, the first service unit using an indirect communication manner, and the target communication address being a communication address of the first service support unit;
  transmitting, by the first service support unit, the first service access request to the first service unit, the first service unit being configured to provide a service according to the first service access request and generate a service access response;
  receiving, by the first service support unit, the service access response transmitted by the first service unit; and
  transmitting, by the first service support unit, the service access response to the first communication unit.

According to another aspect, the embodiments of this application further provide a computing device acting as a first communication unit, the first communication unit including:
  an address obtaining module, configured to: obtain a target communication address, the target communication address being a communication address corresponding to a service provided by a first destination service unit that needs to be accessed, the target communication address being provided by a network repository function unit according to a communication manner used by the first destination service unit, when the first destination service unit is a first service unit using an indirect communication manner, a first communication address being a communication address of a first service support unit that provides a service to the first service unit, and when the first destination service unit is a second service unit using a direct communication manner, the first communication address being a communication address of the second service unit;

a transmission module, configured to transmit a first service access request to the target communication address, the first service access request including a service type of the first destination service unit; and a receiving module, configured to receive a service access response from the target communication address, the service access response being generated after the first destination service unit provides the service.

In the foregoing aspects, composition modules of the first communication unit may further perform steps performed by the first communication unit in one of the foregoing aspects and various possible implementations. For details, refer to the foregoing descriptions of one of the foregoing aspects and various possible implementations.

According to another aspect, the embodiments of this application provide a service support unit, specifically being a first service support unit, the first service support unit including:

a receiving module, configured to receive a first service access request transmitted by a first communication unit to a target communication address, the first service access request including a service type of a first service unit that needs to be accessed, the first service support unit being a service support unit that provides a service to the first service unit, the first service unit using an indirect communication manner, and the target communication address being a communication address of the first service support unit; and a transmission module, configured to transmit the first service access request to the first service unit, the first service unit being configured to provide a service according to the first service access request and generate a service access response;

the receiving module being further configured to receive the service access response transmitted by the first service unit; and the transmission module being further configured to transmit the service access response to the first communication unit.

In the foregoing aspect, composition modules of the first service support unit may further perform steps performed by the first service support unit in one of the foregoing aspects and various possible implementations. For details, refer to the foregoing descriptions of one of the foregoing aspects and various possible implementations.

According to another aspect, the embodiments of this application provide a computing device acting as a first communication unit, the computing device including: a processor and a memory, the memory being configured to store instructions; and the processor being configured to execute the instructions in the memory, to cause the first communication unit to perform the service-based communication method according to one of the foregoing aspects.

According to another aspect, the embodiments of this application provide a computing device acting as a first service support unit, the computing device including: a processor and a memory, the memory being configured to store instructions; and the processor being configured to execute the instructions in the memory, to cause the first service support unit to perform the service-based communication method according to one of the foregoing aspects.

According to another aspect, the embodiments of this application provide a non-transitory computer-readable storage medium, the computer-readable storage medium storing instructions, a processor, when running, performing the service-based communication method based on the instructions.

According to another aspect, the embodiments of this application provide service-based communication system, where when the first destination service unit is a first service unit using an indirect communication manner, the service-based communication system includes: the first communication unit according to one of the foregoing aspects, the first service support unit according to one of the foregoing aspects, a first service unit, and a network repository function unit;

when the first destination service unit is a second service unit using a direct communication manner, the service-based communication system includes: the first communication unit according to one of the foregoing aspects, a second service unit, and a network repository function unit; and the network repository function unit is configured to: provide a target communication address to the first communication unit; and store communication manners used by the first service unit, the second service unit, and a third service unit respectively, and communication addresses of the service units.

BRIEF DESCRIPTION OF THE DRAWINGS

To describe the technical solutions in embodiments of this application more clearly, the following briefly introduces the accompanying drawings required for describing the embodiments. Apparently, the accompanying drawings in the following description show merely some embodiments of this application, and persons skilled in the art may still derive other drawings from these accompanying drawings.

DESCRIPTION OF EMBODIMENTS

Embodiments of this application provide a service-based communication method, unit, and system, and a storage medium, to support a service framework of hybrid communication, thereby improving the service efficiency and flexibility of framework deployment.

To make the objectives, features, and advantages of this application clearer and more comprehensible, the following clearly and completely describes the technical solutions in the embodiments of this application with reference to the accompanying drawings in the embodiments of this application. Apparently, the embodiments described below are merely some rather than all of the embodiments of this application. All other embodiments obtained by persons skilled in the art based on the embodiments of this application fall within the protection scope of this application.

The terms "include", "contain" and any other variants thereof in the specification, claims, and accompanying drawings of this application are intended to cover a non-exclusive inclusion, so that a process, method, system, product, or device that includes a series of units is not necessarily limited to those units, but may include other units not expressly listed or inherent to such a process, method, product, or device.

Detailed descriptions are separately provided below.

Figure 1:
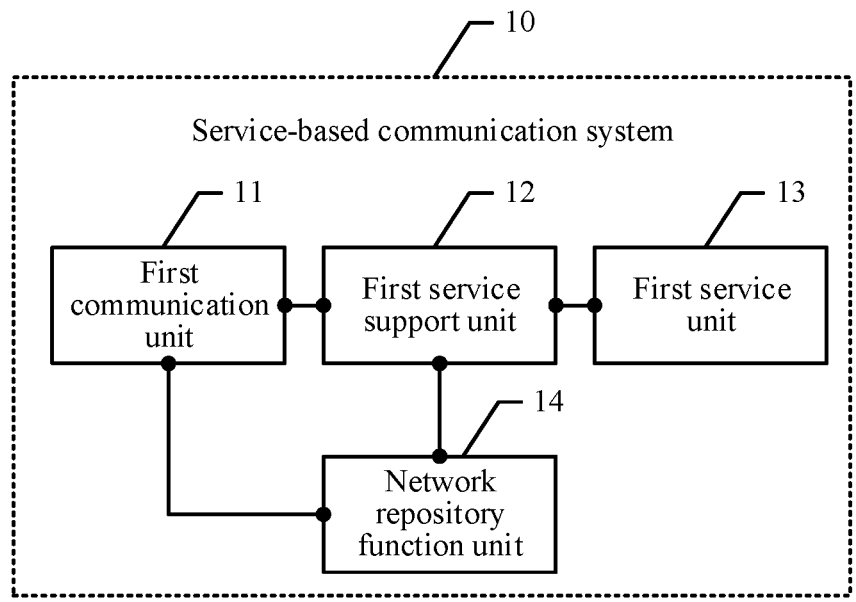
FIG. 1 is a schematic diagram of a composition structure of a service-based communication system according to an embodiment of this application.
Figure 2:
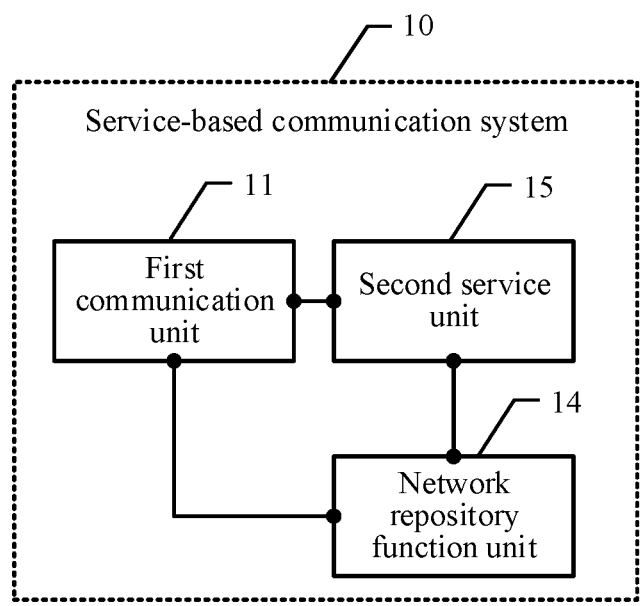
FIG. 2 is a schematic diagram of a composition structure of another service-based communication system according to an embodiment of this application.

The embodiments of this application first provide a service-based communication system. Referring to FIG. 1 and FIG. 2, FIG. 1 and FIG. 2 are schematic diagrams of composition structures of two service-based communication systems according to the embodiments of this application. A service-based communication system provided in an embodiment of this application can be applicable to a service framework under an eSBA architecture. All interfaces between various NF entities inside a control plane are designed by using a service interface-based design method, and internal communication is implemented in a service invocation manner. In this embodiment of this application, the service framework refers to a set of other functions than service logic in the SBA, for example, functions such as registration, authentication, discovery, selection, and routing of a service. The service may be referred to as a microservice. Description is made by using an example in which a service unit provides a service in the subsequent embodiments.

As shown in FIG. 1, a service-based communication system 10 provided in an embodiment of this application may include: a first communication unit 11, a first service support unit 12, a first service unit 13, and a network repository function unit 14. The first communication unit 11 needs to access a first destination service unit, and the first destination service unit is the first service unit 13 using an indirect communication manner.

The service unit in this embodiment of this application refers to a consumer or a producer in the service framework. The service unit may be specifically an instance of a service. The service unit has a communication address. For example, the communication address may be an Internet Protocol (IP) address, or the communication address may be another address for uniquely identifying a service unit provided that communication between units can be met. The service unit in this embodiment of this application may have two communication manners (or referred to as communication modes): an indirect communication manner and a direct communication manner.

A service support unit is provided in this embodiment of this application. The service support unit is a unit that provides a service for the service unit. For example, the service support unit may be a service framework support function (SF SF) unit in the service framework. For the service unit using the indirect communication manner, the service unit may communicate with the service support unit. When the service unit using the indirect communication manner provides the service, a communication address corresponding to the service is not the communication address of the service unit, but a communication address of the service support unit that communicates with the service unit. In the service framework, one service support unit may provide service support for one or more service units, which specifically depends on the structural design of the service framework and is not limited herein.

The first communication unit provided in this embodiment of this application may be specifically a service unit. In this case, the first communication unit may be a consumer in the service framework. For example, that the first communication unit is a third service unit is described by using examples in the subsequent embodiments. In some embodiments, the first communication unit may be further a service support unit. In this case, the first communication unit may provide service support for the third service unit. For example, that the first communication unit is a second service support unit is described by using examples in the subsequent embodiments. The communication unit in this embodiment of this application is a general term of the service unit and the service support unit, and whether the communication unit is a service unit or a service support unit may be determined according to specific scenarios. This is not limited herein.

The network repository function unit is provided in this embodiment of this application. The network repository function unit may be used for registration of all service units.

When the registration succeeds, the network repository function unit stores respective communication address reported by the service units and communication manners used by the service units. For example, for the service unit using the direct communication manner, the network repository function unit stores the communication address of the service unit. For the service unit using the indirect communication manner, the communication address corresponding to the service provided by the service unit is not the communication address of the service unit, but the communication address of the service support unit that communicates with the service unit. Therefore, the network repository function unit stores the communication address of the service support unit that communicates with the service unit using the indirect communication manner, and the communication address of the service unit. For example, if a service 1 (a service unit 1) uses the indirect communication manner, and the service 1 communicates with an SF SF-1 (a service support unit 1), a communication address corresponding to a service provided by the service 1 is a communication address of the SFSF-1 instead of the communication address of the service 1. Therefore, the network repository function unit stores the communication address of the service 1 and the communication address of the SF SF-1 corresponding thereto. The network repository function unit may be a network repository function (NRF) in the service framework in the communication field.

In the system architecture shown in FIG. 1, when the first communication unit needs to access the first service unit, because the first service unit uses the indirect communication manner, the service support is provided for the first service unit by using the first service support unit. Therefore, the first communication unit may first communicate with the first service support unit, and the first service support unit then communicates with the first service unit, to implement indirect communication between the first communication unit and the first service unit.

FIG. 2 is a schematic diagram of a composition structure of another service-based communication system according to an embodiment of this application. Different from FIG. 1, a first destination service unit that a first communication unit 11 in FIG. 2 needs to access is a second service unit 15. Because the second service unit 15 uses the direct communication manner, the first communication unit may communicate with the second service unit 15 directly without the aid of the service support unit, to implement direct communication between the first communication unit 11 and the second service unit 15.

Based on the foregoing service-based communication systems shown in FIG. 1 and FIG. 2, in this embodiment of this application, the indirect communication manner and the direct communication manner may be implemented based on the same service framework. That is, the embodiments of this application provide a service framework solution of hybrid communication. In the service framework of the hybrid communication, a service in direct communication may be deployed, and a service in indirect communication may also be deployed. In addition, the service in the direct communication in the service framework and the service in the indirect communication may invoke each other, and internal units do not sense the communication manners from each other. To resolve the existing problem in the related art that only one communication manner can be provided, the embodiments of this application provide the service framework supporting the hybrid communication, thereby improving the service efficiency and flexibility of framework deployment.

Figure 3:
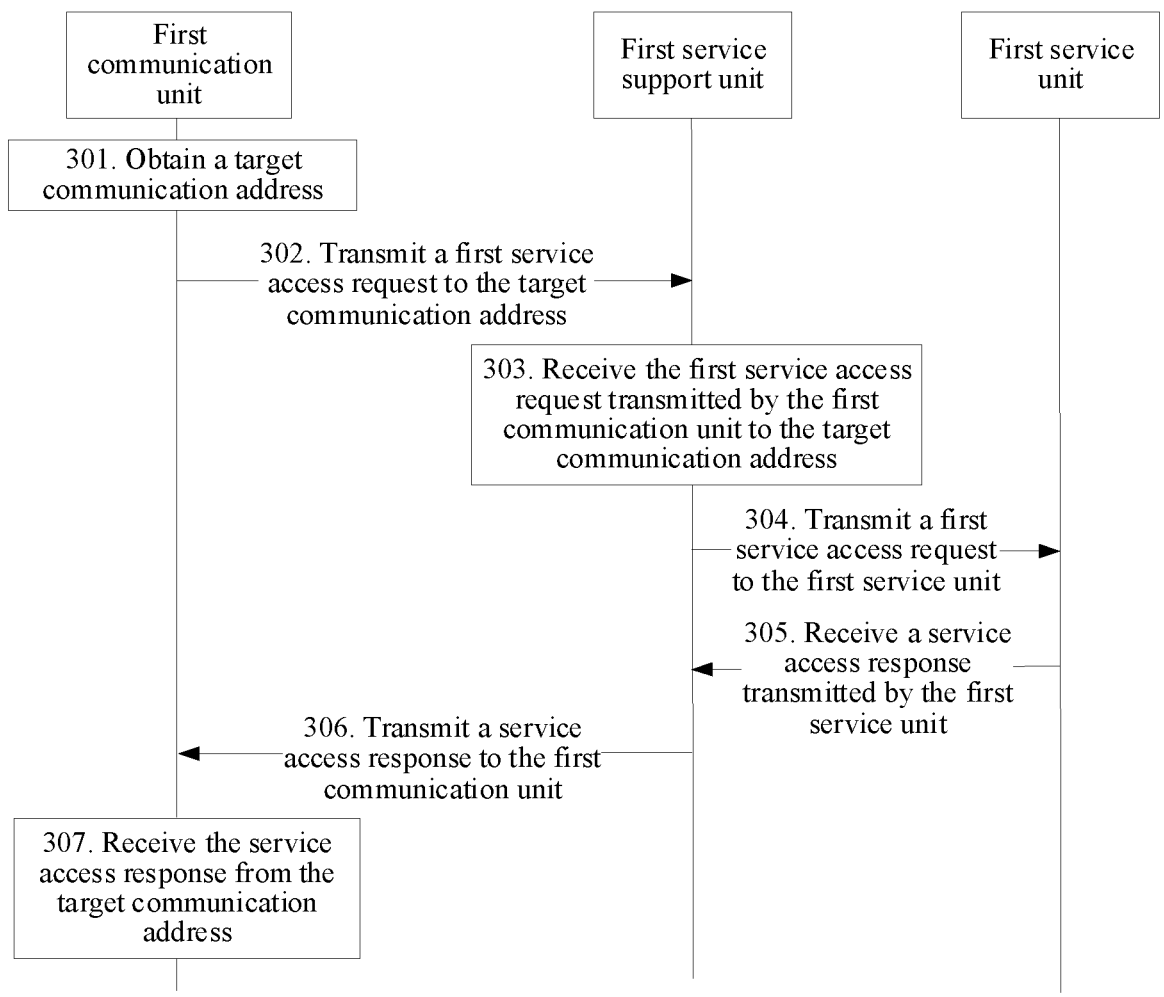
FIG. 3 is a schematic diagram of an interaction process between a first communication unit, a first service support unit, and a first service unit according to an embodiment of this application.

FIG. 3 is a schematic diagram of an interaction process between a first communication unit, a first service support unit, and a first service unit according to an embodiment of this application. Execution steps of a service-based communication method provided in this embodiment of this application are exemplarily shown. The method mainly includes the following steps:

301. The first communication unit obtains a target communication address, the target communication address being a communication address corresponding to a service provided by a first destination service unit that needs to be accessed, the target communication address being provided by a network repository function unit according to a communication manner used by the first destination service unit.

In a case that the first communication unit needs to access the first destination service unit, the first communication unit may obtain the communication address corresponding to the service provided by the first destination service unit that needs to be accessed. For ease of description, the communication address corresponding to the service provided by the first destination service unit that needs to be accessed is defined as a "target communication address". The target communication address may be specifically a communication address, or a communication address list, or a communication address set. This is not limited herein.

The first communication unit in this embodiment of this application may specifically include: a service unit or a service support unit. For example, the first communication unit may be specifically a service or an SF SF. A destination service unit is a service that needs to be accessed, for example, a service unit that needs to be accessed. The service support unit is a unit that provides a service support function for the service unit, and mainly implements a routing forwarding function between the services. Any unit supporting the routing forwarding function between the services may be regarded as the service support unit in this embodiment of this application. For example, the service support unit in this embodiment of this application may be specifically the SFSF. In another example, the service support unit may be further a comment framework support function (CF SF) unit, a message passing system, a service agent unit, or an adapter other than the SF SF. The network repository function unit may be an NRF.

In this embodiment of this application, the target communication address may be provided for the first communication unit by using the network repository function unit. For example, the target communication address may be obtained after real-time interaction between the first communication unit and the network repository function unit, or may be stored in a local memory after being obtained through the interaction between the first communication unit and the network repository function unit in advance. This is not limited herein.

In this embodiment of this application, the target communication address has two implementation cases. In a case that the first destination service unit is the first service unit using the indirect communication manner, the target communication address is the communication address of the first service support unit that provides a service to the first service unit. In a case that the first destination service unit is the second service unit using the direct communication manner, the target communication address is a communication address of the second service unit. Therefore, the target communication address needs to be obtained according to the communication manner (for example, the direct communication manner or the indirect communication manner may be used) used by the first destination service unit that needs to be accessed. This is not limited herein. Description is made in FIG. 3 by using an example in which the first destination service unit is the first service unit using the indirect communication manner.

Figure 4:
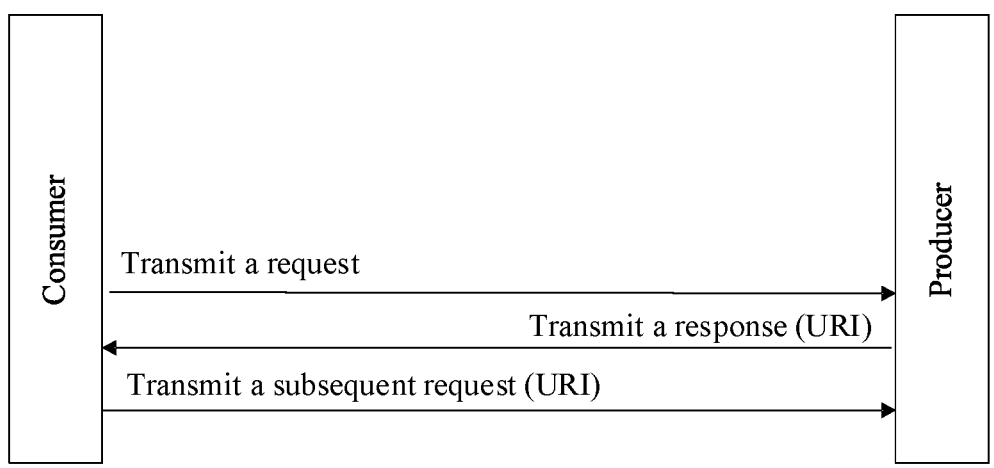
FIG. 4 is a schematic diagram of a deployment manner under an eSBA architecture according to an embodiment of this application.
Figure 5:
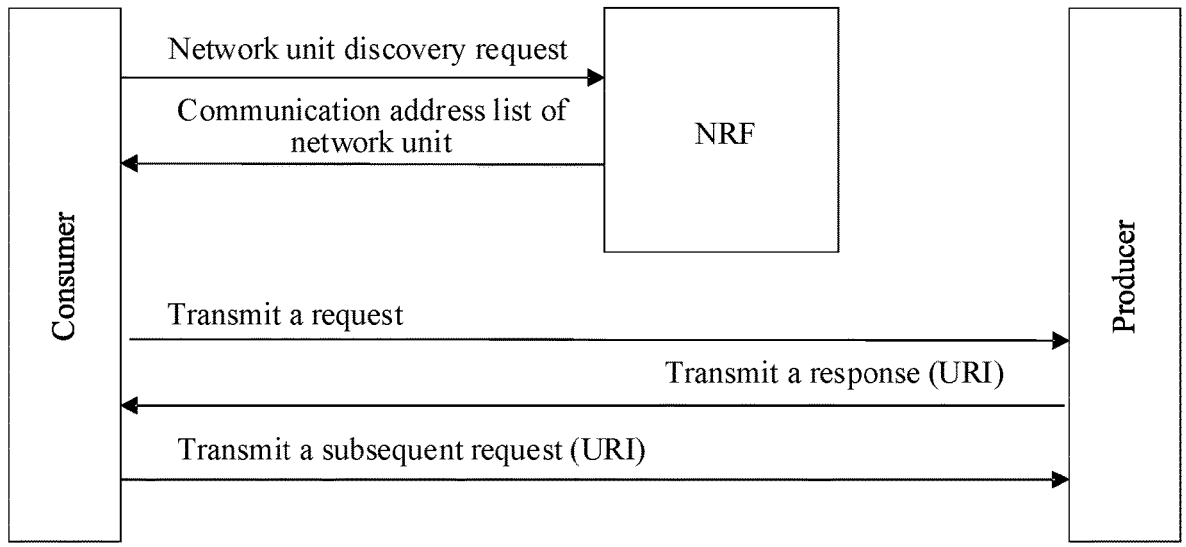
FIG. 5 is a schematic diagram of another deployment manner under an eSBA architecture according to an embodiment of this application.
Figure 6:
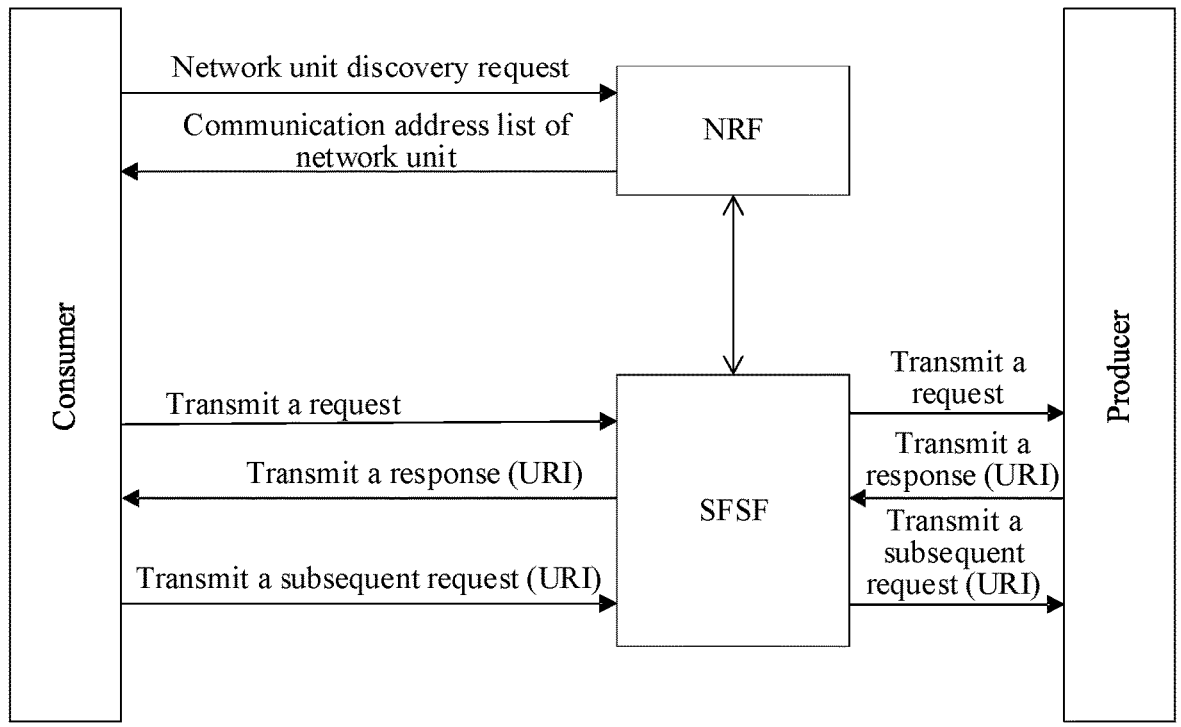
FIG. 6 is a schematic diagram of another deployment manner under an eSBA architecture according to an embodiment of this application.
Figure 7:
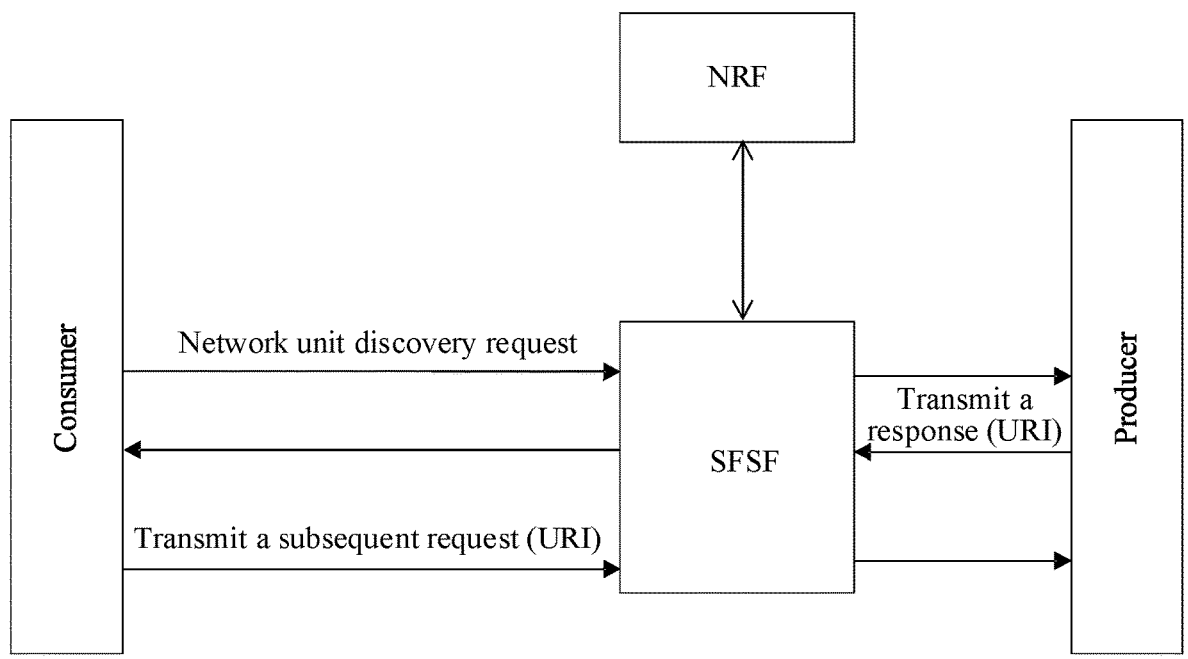
FIG. 7 is a schematic diagram of another deployment manner under an eSBA architecture according to an embodiment of this application.

In some embodiments of this application, FIG. 4, FIG. 5, FIG. 6, and FIG. 7 show four deployment manners under the eSBA architecture. Two services may communicate with each other. One service may be a consumer, and the other service may be a producer. The consumer may communicate with the producer. For example, the consumer transmits a request (for example, Request http: . . . ) to the producer, the producer transmits a response (for example, a uniform resource identifier (URI)) to the consumer, and then, the consumer transmits a subsequent request (an URI) to the producer. As shown in FIG. 4, the consumer discovers the producer based on a configuration of the consumer, and does not need to interact with the NRF to obtain an address of the producer before the consumer transmits the request (for example, Request http: . . . ). As shown in FIG. 5, before the consumer transmits the request (for example, Request http: . . . ), the consumer first interacts with the NRF. For example, the consumer transmits a network unit discovery request (for example, Discovery http: . . . ?NF . . . ) to the NRF, and the NRF returns a communication address list (for example, NF profile(s)) of the network unit to the consumer. As shown in FIG. 6, the consumer and the producer use the indirect communication manner. For example, the consumer transmits the request (for example, Request http: . . . ) to the SFSF, and the SF SF forwards the request to the producer. Similarly, the response (for example, the URI) returned by the producer also needs to be forwarded by using the SFSF. In FIG. 6, the consumer still needs to perform service discovery by using the NRF, to obtain a communication address of the producer. As shown in FIG. 7, the consumer does not need to perform service discovery by using the NRF, to obtain a communication address of the producer, but the consumer directly transmits a request (for example, Request http: . . . ?s-nssi, . . . ) to the SFSF instead. The SFSF performs the service discovery by using the NRF, to obtain the communication address of the producer, and the SF SF then forwards the request to the producer.

The direct communication manner is used in FIG. 4 and FIG. 5, and the indirect communication manner is used in FIG. 6 and FIG. 7. An operator may deploy one or more of the four manners, and microservices between the four deployment manners may access each other. In the foregoing technical solutions, when deploying the service framework, the operator has strict requirements on the communication manner of the service. That is, one service framework can support only one communication manner, either the direct communication or the indirect communication. This implementation has relatively high costs and poor flexibility, and the services supporting different communication manners cannot be deployed in the same service framework. That is, if the service framework is deployed in the manner in FIG. 4 or FIG. 5, the services deployed in the service framework interact in the direct communication manner. If the service framework is deployed in the manner in FIG. 6 or FIG. 7, the services deployed in the service framework interact in the indirect communication manner. In this embodiment of this application, the indirect communication manner and the direct communication manner may be implemented based on the same service framework. That is, the embodiments of this application provide a service framework solution of hybrid communication. In the service framework of the hybrid communication, a service in direct communication may be deployed, and a service in indirect communication may also be deployed. In addition, the service in the direct communication in the service framework and the service in the indirect communication may invoke each other, and internal units do not sense the communication manners from each other. To resolve the existing problem in the related art that only one communication manner can be provided, the embodiments of this application provide the service framework supporting the hybrid communication, thereby improving the service efficiency and flexibility of the service framework.

Figure 8:
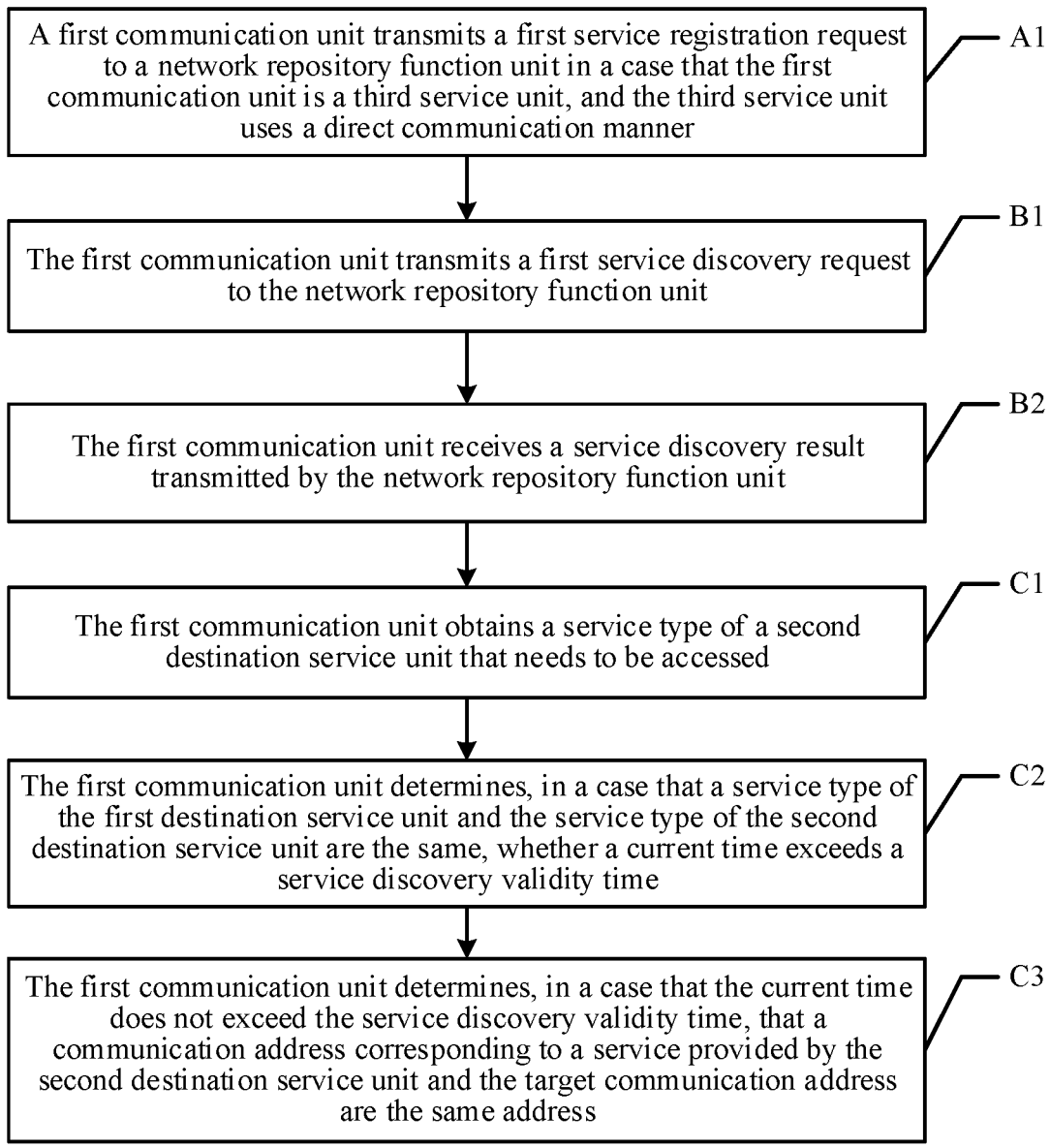
FIG. 8 is a schematic block flowchart of a service-based communication method performed by a first communication unit according to an embodiment of this application.

In some embodiments of this application, as shown in FIG. 8, before step 301 of obtaining, by the first communication unit, a target communication address, the method provided in this embodiment of this application further includes the following steps:

A1. The first communication unit transmits a first service registration request to the network repository function unit when the first communication unit is a third service unit, and the third service unit uses the direct communication manner, the first service registration request including: the direct communication manner used by the third service unit and a communication address of the third service unit.

That is, the first communication unit may be a service unit. Specifically, the first communication unit may be a third service unit. That is, before the third service unit needs to access the first destination service unit, the third service unit needs to be registered with the network repository function unit. For example, the third service unit may transmit a first service registration request to the network repository function unit. The first service registration request includes: the direct communication manner used by the third service unit and the communication address of the third service unit. The communication address of the third service unit may be an IP address of the third service unit, and the network repository function unit may record the communication manner of the third service unit being the direct communication. In addition, if the communication manner of the third service unit is the direct communication, the network repository function unit may further store the IP address of the service.

In some embodiments of this application, after being registered with the network repository function unit, the first communication unit may obtain, in a service discovery manner, the communication address (that is, the target communication address) corresponding to a service provided by the first destination service unit. For example, referring to FIG. 8, step 301 of obtaining, by a first communication unit, a target communication address includes the following steps:

B1. The first communication unit transmits a first service discovery request to the network repository function unit, the first service discovery request including: a service type of the first destination service unit that needs to be accessed. The network repository function unit may be configured to obtain a communication address of the first destination service unit according to the first service discovery request.

B2. The first communication unit receives a service discovery result transmitted by the network repository function unit, the service discovery result including the target communication address.

The service type of the first destination service unit may be determined according to requirements of service invocation. For example, the service type of the first destination service unit may be a user protocol data unit (PDU) session establishment service or an event open service. All the service units are registered with the network repository function unit. The network repository function unit determines, according to the service discovery request, that the first destination service unit uses the direct communication manner, and obtains, through service discovery, the communication address (that is, the target communication address) corresponding to the service provided by the first destination service unit. The service discovery result may include: a list of communication addresses corresponding to the services provided by the first destination service unit, and one communication address list or one communication address set or the like may be obtained through one service discovery result. The network repository function unit then transmits the service discovery result, so that the first communication unit may obtain the target communication address according to the service discovery result.

Further, in some embodiments of this application, the network repository function unit may further set a service validity time corresponding to the service discovery result. The length of the service validity time may be set according to a specific scenario. Referring to FIG. 6, when the service discovery result further includes: a service discovery validity time, the method provided in this embodiment of this application may further include the following steps:

C1. The first communication unit obtains a service type of a second destination service unit that needs to be accessed.

C2. The first communication unit determines, when the service type of the first destination service unit and the service type of the second destination service unit are the same, whether a current time exceeds the service discovery validity time.

C3. The first communication unit determines, when the current time does not exceed the service discovery validity time, that a communication address corresponding to a service provided by the second destination service unit and the target communication address are the same address.

The first destination service unit is a service unit that the first communication unit needs to access for the first time, the second destination service unit is a service unit that the first communication unit needs to access next time, and the first communication unit may store a first-time service discovery result and a corresponding service discovery validity time. In a case that the service type of the first destination service unit and the service type of the second destination service unit are the same, the first communication unit determines whether a current time exceeds a service discovery validity time of a last service of the same type. In a case that the current time does not exceed the service discovery validity time of the last service of the same type, the first communication unit does not need to interact with the network repository function unit again, and the first communication unit directly obtains the target communication address from the service discovery result of the last obtained service of the same type in the local memory. When the target communication address of the second destination service unit is obtained, the service discovery procedure of the NRF does not need to be performed, thereby implementing a service discovery enhancement function and improving the service invocation efficiency.

For example, the service discovery result may be an IP address list of the service producer, or may be an IP address list of the SF SF corresponding to the service producer. In addition, the NRF also returns the validity time of the service discovery result. That is, for a terminal device of another user connected to the service consumer, when the terminal device needs to select the same type of service producer, if the validity time of the service discovery result has not expired, the service discovery does not need to be performed by using the NRF, and the service discovery result returned before is directly used. If the validity time has expired, the service discovery needs to be performed again by using the NRF.

Figure 9:
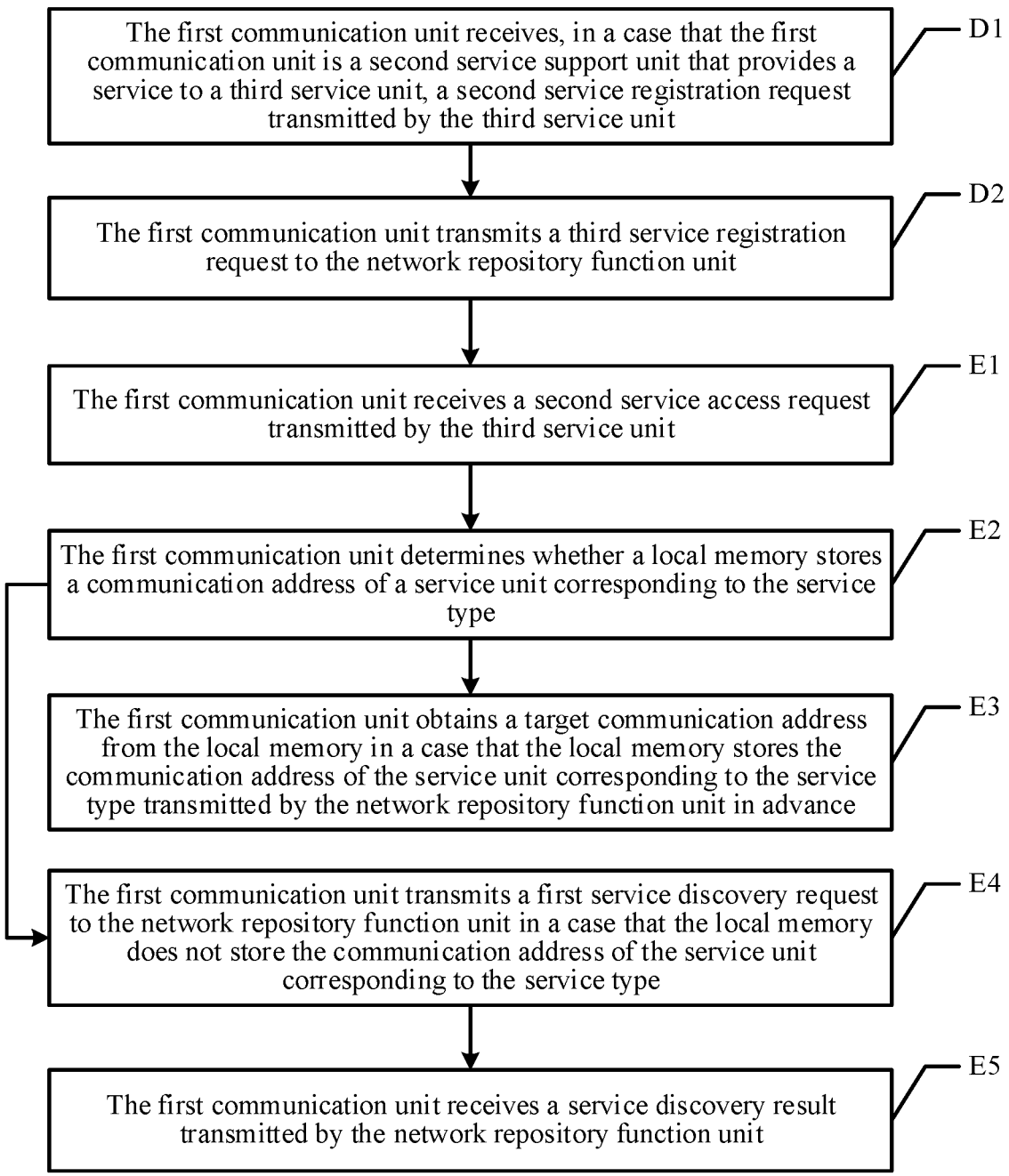
FIG. 9 is a schematic block flowchart of another service-based communication method performed by a first communication unit according to an embodiment of this application.

In some embodiments of this application, the first communication unit may be further a service support unit. In this case, the first communication unit may provide a service for the third service unit. The third service unit uses the indirect communication manner. For example, the first communication unit may be specifically an SFSF. As shown in FIG. 9, before step 301 of obtaining, by the first communication unit, a target communication address, the method provided in this embodiment of this application further includes the following steps:

D1. The first communication unit receives, when the first communication unit is a second service support unit that provides a service to a third service unit, a second service registration request transmitted by the third service unit, the second service registration request including: the indirect communication manner used by the third service unit and a communication address of the third service unit.

D2. The first communication unit transmits a third service registration request to the network repository function unit, the third service registration request including: the indirect communication manner used by the third service unit, the communication address of the third service unit, and a communication address of the second service support unit, a communication address corresponding to a service provided by the third service unit being the communication address of the second service support unit.

The first communication unit may be further the second service support unit. In this case, the first communication unit may provide the service support for the third service unit. Because the third service unit uses the indirect communication manner, the third service unit first transmits the second service registration request to the first communication unit, the first communication unit adds the communication address of the second service support unit to the second service registration request, and then generates the third service registration request, the first communication unit transmits the third service registration request to the network repository function unit, and the network repository function unit stores the third service unit using the indirect communication manner and the communication address of the third service unit, and stores the communication address of the second service support unit as the communication address corresponding to the service provided by the third service unit.

Further, the first communication unit may be further the second service support unit. In this case, the first communication unit may provide the service support for the third service unit. Because the third service unit uses the indirect communication manner, the first communication unit may obtain, in the service discovery manner, the communication address (that is, the target communication address) corresponding to the service provided by the first destination service unit. For example, referring to FIG. 9, step 301 of obtaining, by a first communication unit, a target communication address includes the following steps:

E1. The first communication unit receives a second service access request transmitted by the third service unit, the second service access request including: the service type of the first destination service unit that the third service unit needs to access and service payload data.

E2. The first communication unit determines whether a local memory stores a communication address of a service unit corresponding to the service type.

E3. The first communication unit obtains a target communication address from the local memory when the local memory stores the communication address of the service unit corresponding to the service type transmitted by the network repository function unit in advance.

The third service unit needs to access the first destination service unit. Because the third service unit uses the indirect communication manner, the third service unit transmits the second service access request to the first communication unit (in this case, the first communication unit is the second service support unit). The service payload data carried in the second service access request is used for processing the services. The payload data may also be different according to different specific services. This is not limited herein.

In this embodiment of this application, the first communication unit is used as the second service support unit. The second service support unit has a cache function. That is, the local memory pre-stores communication addresses of the service units of different service types when the local memory stores the communication address of the service unit corresponding to the service type transmitted by the network repository function unit in advance. The first communication unit does not need to interact with the network repository function unit again, and the first communication unit directly obtains the target communication address from the local memory, thereby implementing the service discovery enhancement function.

Further, in some embodiments of this application, after step E1 is performed, step E2 may specifically include: determining, by the first communication unit, whether a local memory stores a communication address discovered by a service unit corresponding to the service type, and a validity time of the service discovery result.

Step E3 may specifically include: obtaining, by the first communication unit, the target communication address from the local memory when the local memory stores the communication address of the service unit corresponding to the service type transmitted by the network repository function unit in advance, and the validity time of the service discovery result is not exceeded.

In some embodiments of this application, the network repository function unit may further set a validity time for each service discovery result, and the service discovery result may be repeatedly used within the validity time to perform service access. After the validity time has expired, the service access can be performed only when the service discovery needs to be performed again.

Further, in addition to including the foregoing step E1 to step E3, referring to FIG. 9, step 301 of obtaining, by the first communication unit, a target communication address further includes the following steps:

E4. The first communication unit transmits a first service discovery request to the network repository function unit when the local memory does not store the communication address of the service unit corresponding to the service type, the first service discovery request including: the service type of the first destination service unit that needs to be accessed, the network repository function unit being configured to obtain a communication address of the first destination service unit according to the first service discovery request.

E5. The first communication unit receives a service discovery result transmitted by the network repository function unit, the service discovery result including the target communication address.

The first communication unit determines whether the local memory stores the communication address of the service unit corresponding to the service type. In a case that the local memory does not store the communication address of the service unit corresponding to the service type, the first communication unit further needs to interact with the network repository function unit, to complete the service discovery. For example, the first communication unit may be the SF SF. When the SFSF does not locally store the IP address corresponding to the service provided by the first destination service unit, the SFSF needs to perform the service discovery with the NRF.

For example, the first communication unit as the SFSF has the service discovery enhancement function. That is, after the SF SF performs the service discovery by using the NRF, the NRF returns the validity time of the service discovery result, That is, for all instances of the same type of service consumers on the SF SF, for access of another user equipment on any service consumer, when the another user equipment needs to select the same type of service producer, if the validity time of the service discovery result has not expired, the service discovery does not need to be performed by using the NRF, and the service discovery result returned before is directly used. If the validity time has expired, the service discovery needs to be performed again by using the NRF.

302. The first communication unit transmits a first service access request to the target communication address, the first service access request including a service type of the first destination service unit.

In this embodiment of this application, that the target communication address has two implementation cases is recorded in step 301. In a case that the first destination service unit is the first service unit using the indirect communication manner, the target communication address is the communication address of the first service support unit that provides the service support to the first service unit. In a case that the first destination service unit is the second service unit using the direct communication manner, the target communication address is a communication address of the second service unit. For example, when the target communication address is the communication address of the second service unit, the first communication unit may transmit the first service access request to the second service unit. In another example, when the target communication address is the communication address of the first service support unit, the first communication unit may transmit the first service access request to the first service support unit.

303. The first service support unit receives a first service access request transmitted by the first communication unit to the target communication address, the first service access request including a service type of a first service unit that needs to be accessed, the first service support unit being a service support unit that provides a service to the first service unit, the first service unit using an indirect communication manner, and the target communication address being a communication address of the first service support unit.

In this embodiment of this application, the first communication unit does not need to know the communication manner of the first destination service unit, the first communication unit performs step 301 and step 302, and the first communication unit transmits the first service access request to the target communication address. When the target communication address is the communication address of the first service support unit, the first service support unit may receive the first service access request from the first communication unit.

Figure 10:
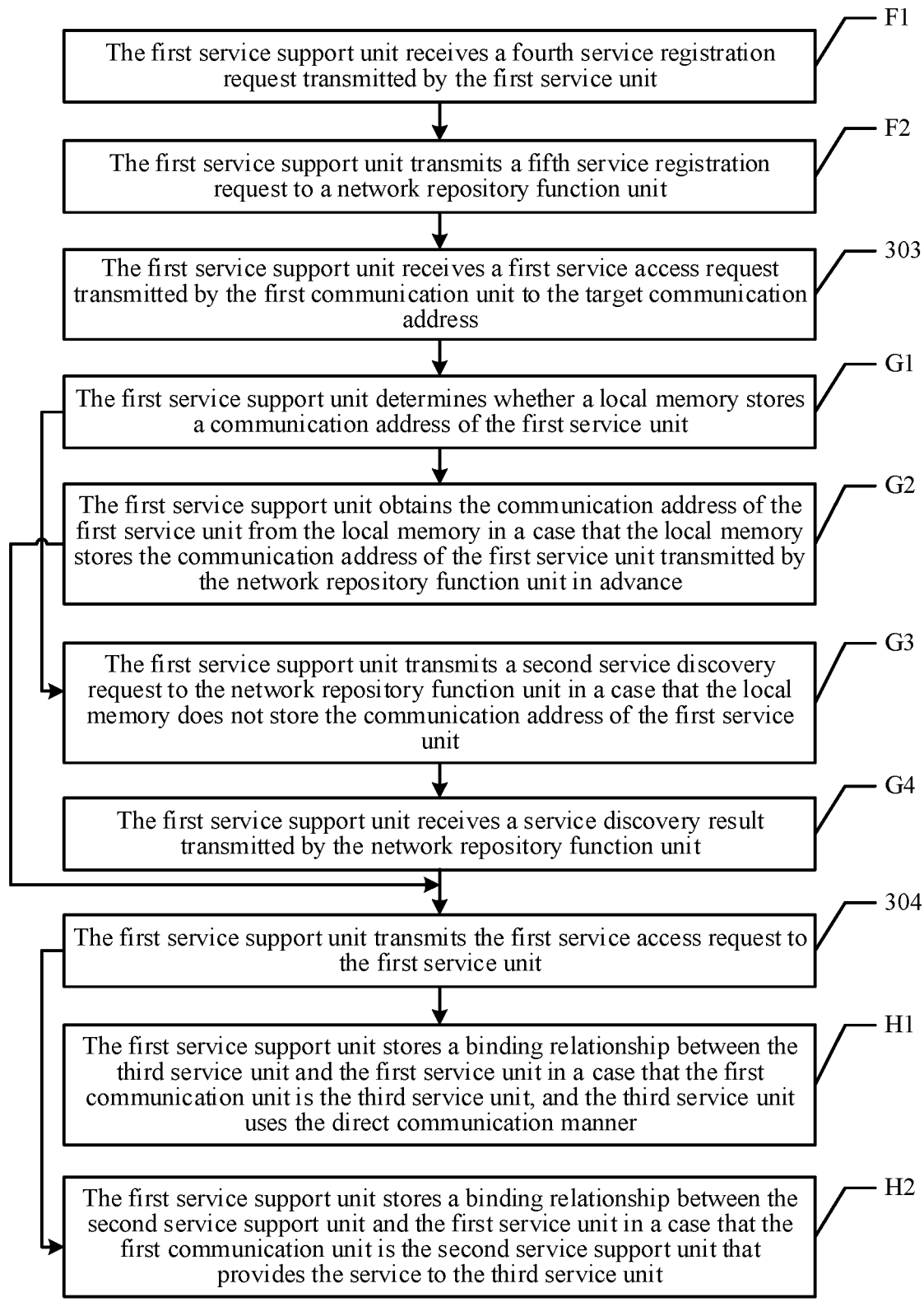
FIG. 10 is a schematic block flowchart of a service-based communication method performed by a first service support unit according to an embodiment of this application.

In some embodiments of this application, referring to FIG. 10, before step 303 of receiving, by the first service support unit, a first service access request transmitted by a first communication unit to a target communication address, the method provided in this embodiment of this application may further include the following steps:

F1. The first service support unit receives a fourth service registration request transmitted by the first service unit, the fourth service registration request including: the indirect communication manner used by the first service unit and a communication address of the first service unit.

F2. The first service support unit transmits a fifth service registration request to a network repository function unit, the fifth service registration request including: the indirect communication manner used by the first service unit, the communication address of the first service unit, and the communication address of the first service support unit.

The first service support unit may be further a unit that provides service support for the first service unit. For example, the first service support unit may be the SF SF. The first service unit uses the indirect communication manner, the first service unit first transmits the fourth service registration request to the first service support unit, the first service support unit adds the communication address of the first service support unit to the fourth service registration request, and then generates the fifth service registration request, the first service support unit transmits the fifth service registration request to the network repository function unit, and the network repository function unit stores the first service unit using the indirect communication manner and the communication address of the first service unit, and stores the communication address of the first service support unit as the communication address corresponding to the service provided by the first service unit.

Further, the first service support unit may provide the service for the first service unit, the first service unit uses the indirect communication manner, and the first service support unit may obtain the communication address of the first service unit in the service discovery manner. For example, referring to FIG. 10, before step 304 of transmitting, by the first service support unit, the first service access request to the first service unit, the method provided in this embodiment of this application may further include the following steps:

G1. The first service support unit determines whether a local memory stores a communication address of the first service unit.

G2. The first service support unit obtains the communication address of the first service unit from the local memory when the local memory stores the communication address of the first service unit transmitted by the network repository function unit in advance.

The first service support unit needs to access the first service unit. The first service support unit has a cache function. That is, the local memory pre-stores communication addresses of the service units of different service types when the local memory stores the communication address of the first service unit transmitted by the network repository function unit in advance. The communication address of the first service unit is the communication address of the first service unit. The first communication unit does not need to interact with the network repository function unit again, and the first communication unit directly obtains the communication address of the first service unit from the local memory, thereby implementing the service discovery enhancement function.

Further, in addition to the foregoing step G1 and step G2 performed by the first service support unit, referring to FIG. 10, the method provided in this embodiment of this application further includes the following steps:

G3. The first service support unit transmits a second service discovery request to the network repository function unit when the local memory does not store the communication address of the first service unit, the second service discovery request including the service type of the first service unit.

G4. The first service support unit receives a service discovery result transmitted by the network repository function unit, the service discovery result including the communication address of the first service unit.

The first service support unit determines whether the local memory stores the communication address of the first service unit. In a case that the local memory does not store the communication address of the first service unit, the first service support unit further needs to interact with the network repository function unit, to complete the service discovery. For example, the first service support unit may be the SFSF. When the SFSF does not locally store the IP address corresponding to the service provided by the first destination service unit, the SFSF needs to perform the service discovery with the NRF.

For example, the first service support unit as the SFSF has the service discovery enhancement function. That is, after the SF SF performs the service discovery by using the NRF, the NRF returns the validity time of the service discovery result, That is, for all instances of the same type of service consumers on the SF SF, for access of another user equipment on any service consumer, when the another user equipment needs to select the same type of service producer, if the validity time of the service discovery result has not expired, the service discovery does not need to be performed by using the NRF, and the service discovery result returned before is directly used. If the validity time has expired, the service discovery needs to be performed again by using the NRF.

In the foregoing embodiments of this application, when the first communication unit or the first service support unit and the network repository function unit perform the service discovery, the network repository function unit needs to first authenticate the service unit that initiates the access. Only when the authentication succeeds, the network repository function unit transmits the service discovery result. When the authentication fails, the network repository function unit rejects the service discovery request of the service unit that initiated the access.

304. The first service support unit transmits the first service access request to the first service unit, the first service unit being configured to provide a service according to the first service access request and generate a service access response.

In this embodiment of this application, the first destination service unit is the first service unit using the indirect communication manner. The first service support unit may provide the service for the first service unit, and the first service support unit may obtain the communication address of the first service unit. After the first service support unit may receive the first service access request from the first communication unit, the first service support unit may forward the first service access request to the first service unit, and the first service unit may provide the service according to the first service access request and generate the service access response.

In some embodiments of this application, after step 304 of transmitting, by the first service support unit, the first service access request to the first service unit, the method provided in this embodiment of this application may further include the following step:

H1. The first service support unit stores a binding relationship between the third service unit and the first service unit when the first communication unit is the third service unit, and the third service unit uses the direct communication manner; or H2. The first service support unit stores a binding relationship between the second service support unit and the first service unit when the first communication unit is the second service support unit that provides the service to the third service unit.

When the first service support unit provides the service support for the first service unit, and the access request indicating that the third service unit needs to access the first service unit is obtained, if the third service unit uses the direct communication manner, the first service support unit may store the binding relationship between the third service unit and the first service unit, so that a service access response message is transmitted, and the service discovery does not need to be performed again. For example, if the first service unit is a service 2 (a service unit 2), the third service unit is a service 3 (a service unit 3), and the first service support unit is the SFSF, the SF SF may temporarily store a binding relationship between an instance of the service 2 (an instance of the service unit 2) and an instance of the service 3 (an instance of the service unit 3). The binding relationship is valid only for access of the same user equipment. If the third service unit uses the indirect communication manner, the first service support unit may store the binding relationship between the second service support unit and the first service unit, so that a service access response message is transmitted, and the service discovery does not need to be performed again.

In some embodiments of this application, after storing the binding relationship between the third service unit and the first service unit, the first service support unit may further set a validity time for the binding relationship, and the binding relationship may be repeatedly used within the validity time to perform the service access. After the validity time has expired, the service access can be performed only when the service discovery needs to be performed again.

305. The first service support unit receives the service access response transmitted by the first service unit.

The first service unit is configured to provide the service according to the first service access request and generate the service access response. Service functions provided by the first service unit are not limited herein. After generating the service access response, the first service unit transmits the service access response to the first service support unit.

306. The first service support unit transmits the service access response to the first communication unit.

The first service support unit may generate the service access response, and then transmit the service access response to the first communication unit.

307. The first communication unit receives the service access response from the target communication address.

After the first communication unit transmits the first service access request to the target communication address in step 302, the first communication unit may receive the service access response through the target communication address. Because the first destination service unit that needs to be accessed is the first service unit, the service access response received by the first communication unit is generated after the first service unit provides the service.

In some embodiments of this application, when the first communication unit is the second service support unit that provides the service to the third service unit, after the first communication unit receives the service access response from the target communication address in step 307, the method provided in this embodiment of this application further includes the following step:

transmitting, by the first communication unit, a second service access response to the third service unit.

If the first communication unit is the second service support unit, and the third service unit needs to access the first destination service unit, after the first destination service unit provides the service and generates the service access response, the first communication unit further needs to forward the service access response to the third service unit after receiving the service access response from the target communication address.

It can be learned from the descriptions of the embodiments of this application in the foregoing embodiments that, the first communication unit first obtains the communication address corresponding to the service provided by the first destination service unit that needs to be accessed, that is, obtains the target communication address. In a case that the first destination service unit is the first service unit using the indirect communication manner, the target communication address is the communication address of the first service support unit that provides the service to the first service unit. In a case that the first destination service unit is the second service unit using the direct communication manner, the target communication address is the communication address of the second service unit. The first communication unit transmits the first service access request to the target communication address, the first service access request including the service type of the first destination service unit. The first service support unit transmits the first service access request to the first service unit. The first service support unit receives the service access response transmitted by the first service unit. The first service support unit transmits the service access response to the first communication unit. The first communication unit receives the service access response from the target communication address. In this embodiment of this application, the first communication unit may communicate with the first service unit using the indirect communication manner, and may further communicate with the second service unit using the direct communication manner. Therefore, in this embodiment of this application, the indirect communication manner and the direct communication manner may be implemented based on the same service framework. That is, the embodiments of this application provide a service framework solution of hybrid communication. In the service framework of the hybrid communication, a service in direct communication may be deployed, and a service in indirect communication may also be deployed. In addition, the service in the direct communication in the service framework and the service in the indirect communication may invoke each other, and the communication manners from each other are not sensed. To resolve the existing problem in the related art that only one communication manner can be provided, the embodiments of this application provide the service framework supporting the hybrid communication, thereby improving the service efficiency and flexibility of framework deployment.

For better understanding and implementation of the foregoing solutions of this embodiment of this application, the following makes a specific description by using a corresponding application scenario as an example.

Figure 11:
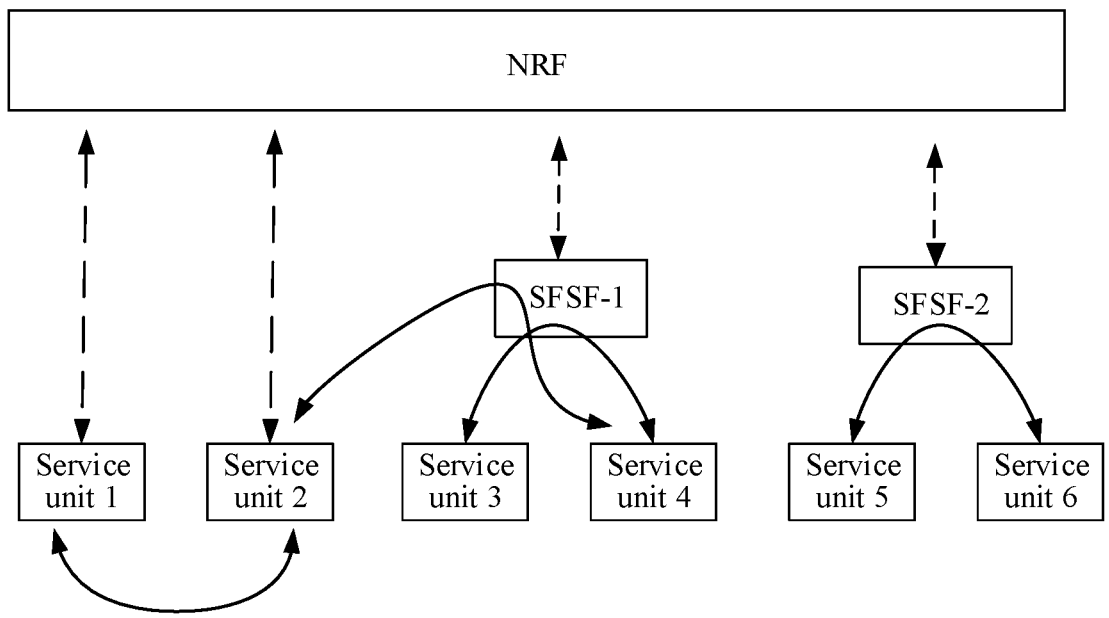
FIG. 11 is a schematic diagram of a service framework of hybrid communication according to an embodiment of this application.

The embodiments of this application provide a service-based communication method for defects of a service framework in a single communication manner. As shown in FIG. 11, FIG. 11 is a schematic diagram of a service framework of hybrid communication according to an embodiment of this application. The service unit (that is, the service) in the service framework described in this embodiment of this application may refer to a microservice or a service provided in the industry, or an NF (network function) or an NF service mentioned in the 5G core network service-based architecture in R15.

The embodiments of this application provide a service framework solution of the hybrid communication shown in FIG. 11. In the service framework of the hybrid communication, a microservice in direct communication may be deployed, and a microservice in indirect communication may also be deployed. In addition, the service in the direct communication in the service framework and the service in the indirect communication may invoke each other, and the communication manners from each other are not sensed. The service framework of the hybrid communication may include: an NRF, an SFSF-1, an SF SF-2, a service unit 1, a service unit 2, a service unit 3, a service unit 4, a service unit 5, and a service unit 6. The service units 1, 2, 3, 4, 5, and 6 are all registered with the NRF. The service unit 1 and the service unit 2 interact in a direct communication manner, and the service unit 3, the service unit 4, the service unit 5, and the service unit 6 interact in an indirect communication manner.

In this embodiment of this application, each service unit first performs service registration. The service units also register respective communication manners while performing the registration. For example, communication manners of the service unit 1 and the service unit 2 are direct communication during the registration, and the NRF stores IP addresses of the services in the direct communication. The communication manners of the service unit 3, the service unit 4, the service unit 5, and the service unit 6 are indirect communication during the registration, and the NRF stores IP addresses of the SFSF-1 and the SFSF-2, registers IP addresses of the service unit 3 and the service unit 4 as the IP address of the SFSF-1, and registers IP addresses of the service unit 5 and the service unit 6 as the IP address of the SFSF-2.

The NRF records communication manners of the services: the direct communication or the indirect communication. If a communication manner of a service is the direct communication, a communication manner of the service and an IP address of the service are stored. If a communication manner of a service is the indirect communication, the communication manner of the service, an IP address of the service, and an IP address of an SFSF corresponding to the service are stored.

The service discovery and routing in this embodiment of this application are next described. In the service discovery and routing, a service consumer in the indirect communication does not know a communication manner of a service producer, and only transmits a service access request to the SF SF in a routine manner. The SFSF may obtain an IP address (or an IP address list) of a peer by accessing the NRF. If obtaining a plurality of IP addresses, the SFSF selects one IP address from the plurality of IP addresses to perform service access. The SFSF does not need to know a communication manner of a peer service.

In the service discovery and routing, a service consumer in the direct communication does not know the communication manner of the service producer either, the service consumer transmits a service discovery request to the NRF in a routine manner, and the NRF returns an IP address list of the service producer. If being in the indirect communication manner, the service producer returns an IP address list of the SF SF corresponding to the service producer. The service consumer selects one IP address from the IP address list to transmit the service access request. The service consumer does not need to know the communication manner of the service of the service producer, nor does the service consumer need to know whether the IP address corresponds to the service producer or the SF SF.

Figure 12:
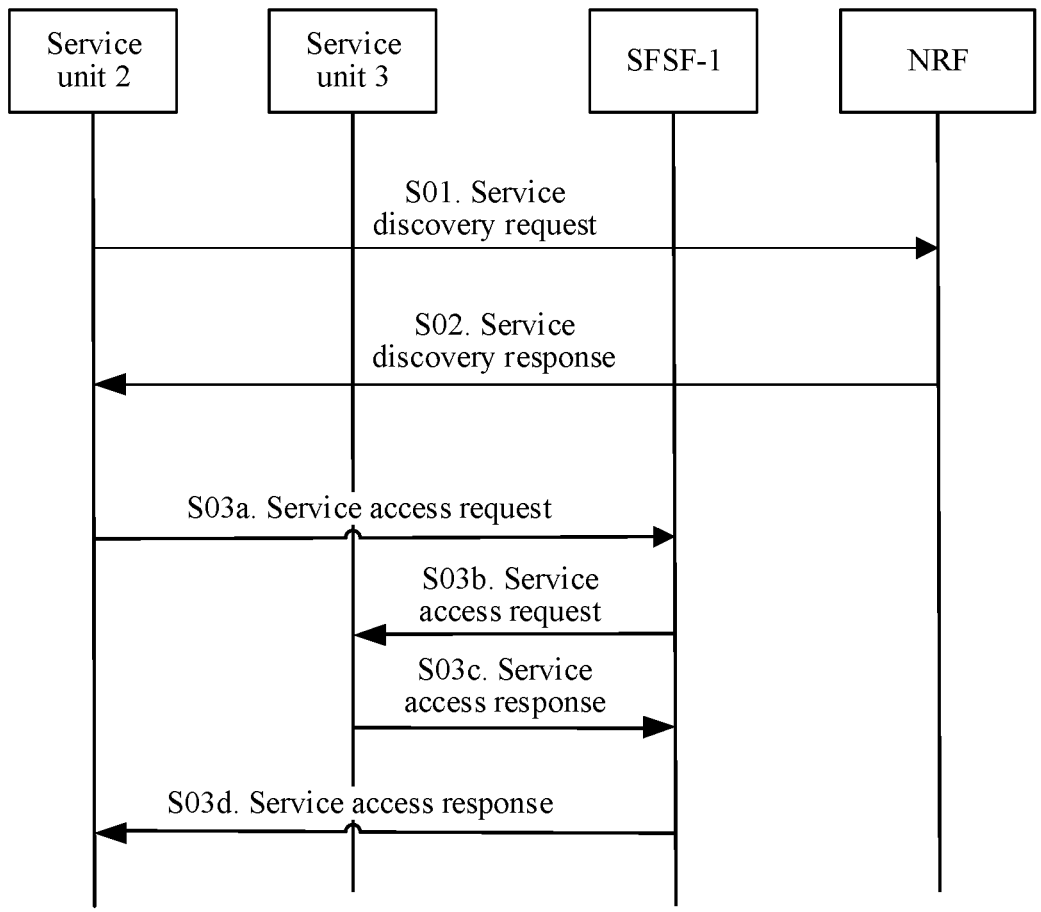
FIG. 12 is a schematic diagram of a service discovery and access procedure according to an embodiment of this application.
Figure 13:
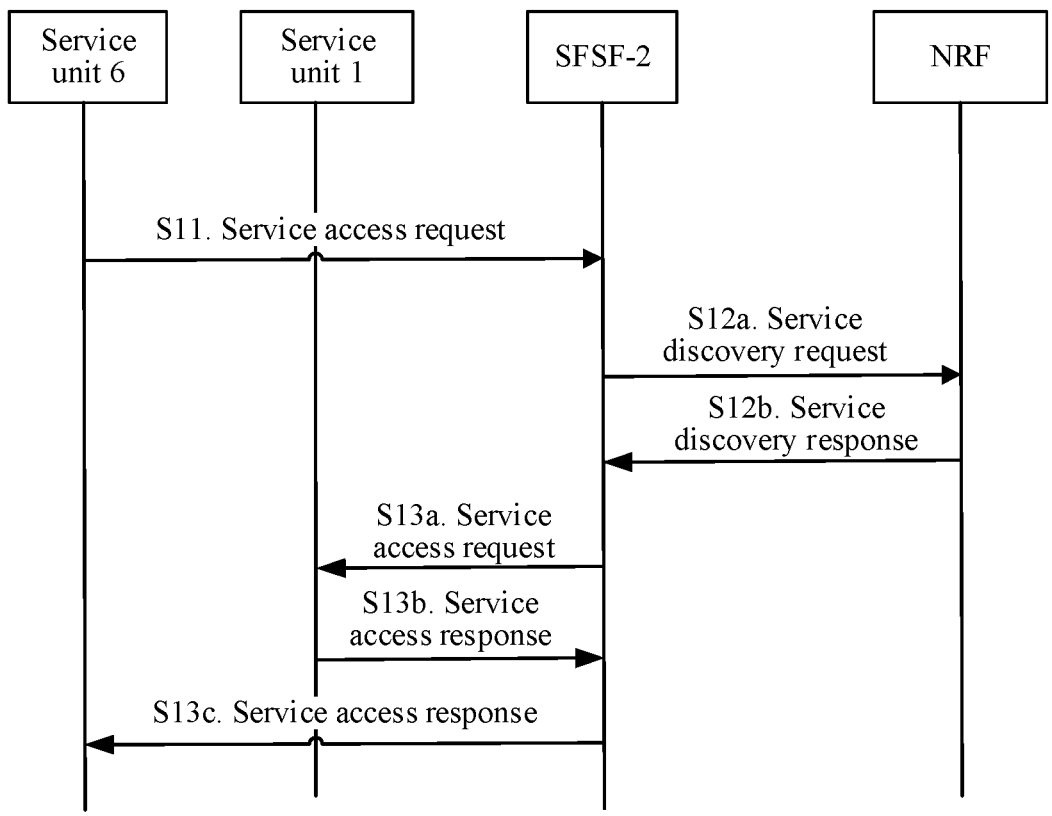
FIG. 13 is a schematic diagram of another service discovery and access procedure according to an embodiment of this application.

According to different communication manners of the services, the service discovery of the hybrid communication may be divided into the following two cases: two service discovery procedures shown in FIG. 12 and FIG. 13.

As shown in FIG. 12, a microservice in direct communication invokes a microservice in indirect communication. For example, in FIG. 12, the service unit 2 invokes the service unit 3, where the service unit 2 uses the direct communication manner, and the service unit 3 uses the indirect communication manner. A service discovery and access procedure is as follows:

S01. The service unit 2 transmits a service discovery request message to the NRF, the message including a service type of the to-be-accessed service (the service unit 3).

S02. The NRF authenticates whether the service unit 2 can access the service type (the service unit 3), and simultaneously queries an IP address and a communication manner of the service. If the service unit 3 is allowed to be accessed by the service unit 2, an IP address (that is, an IP address of the SFSF-1) of an instance of the service unit 3 is returned to the service unit 2. If a plurality of instances of the service unit 3 all perform communication routing by using the SFSF-1, the IP address of the SF SF-1 is returned to the service unit 2. If SFSFs corresponding to different instances of the service unit 3 are different, an IP address list of the SFSFs is returned to the service unit 2.

S03a. If receiving a plurality of to-be-accessed IP address lists, the service unit 2 selects one IP address from the IP address lists to transmit the service access request, for example, selects the IP address of the SFSF-1 in FIG. 12. If receiving only one IP address, the service unit 2 transmits the service access request to the IP address. The service access request includes the service type of the to-be-accessed service unit 3.

The service unit 2 does not know whether the IP address corresponds to the IP address of the service or the IP address of the SFSF.

S03b. After receiving the service access request of the service unit 2, the SFSF-1 selects one instance from the service instances whose service types is the service unit 3, and transmits the service access request to the instance. The SFSF-1 temporarily stores a binding relationship between the instance of the service unit 2 and the instance of the service unit 3, and the binding relationship is valid only for access of the user equipment. The binding relationship may be valid only for the access, or a validity time may be set by the SFSF.

S03c. After completing processing of the request, the instance of the service unit 3 returns a response to the SFSF-1.

S03d. The SFSF-1 returns the response message to the instance of the service unit 2.

In another example, as shown in FIG. 13, a microservice in indirect communication invokes a microservice in direct communication. For example, in FIG. 13, the service unit 6 invokes the service unit 1, where the service unit 6 uses the indirect communication manner, and the service unit 1 uses the direct communication manner. A service discovery and access procedure is as follows:

S11. An instance of the service unit 6 transmits a service access request to the SFSF-2. The service access request includes a service type of the to-be-accessed service unit 1 and service payload data.

S12a. The SFSF-2 checks whether there is an instance whose service type is the service unit 1 inside the SFSF-2. If not, the SFSF-2 transmits a service discovery request to the NRF. The request includes a service type of the service unit 6, that is, the service consumer, and the service type of the service unit 1, that is, the service producer.

S12b. The NRF authenticates the service discovery request. If the service type of the service unit 6 can access the service type of the service unit 1, the authentication succeeds. If the authentication by the NRF succeeds, the IP address list of the instances of the service units 1 is returned to the SFSF-2.

S13a. The SFSF-2 selects an IP address of one instance of the service unit 1 from the returned IP address list to transmit the access request of the instance of the service unit 6 to the instance corresponding to the IP address. The SFSF-2 stores a binding relationship between the instance of the service unit 6 and the instance of the service unit 1, and the binding relationship is valid for access of the user equipment. The binding relationship may be valid only for the access, or a validity time may be set by the SFSF.

S13b. After completing processing of the access request, the instance of the service unit 1 transmits a response message to the SFSF-2.

S13c. The SFSF-2 transmits the response message after service processing to the instance of the service unit 6.

The service discovery enhancement function in this embodiment of this application is next described by using examples. The service discovery result may be an IP address list of the service producer, or may be an IP address list of the SF SF corresponding to the service producer. In addition, the NRF also returns the validity time of the service discovery result. That is, for access of another user equipment on the service consumer, when the another user equipment needs to select the same type of service producer, if the validity time of the service discovery result has not expired, the service discovery does not need to be performed by using the NRF, and the service discovery result returned before is directly used. If the validity time has expired, the service discovery needs to be performed again by using the NRF.

The service discovery enhancement function is also applicable to the SF SF. That is, after the SF SF performs the service discovery by using the NRF, the NRF returns the validity time of the service discovery result, That is, for all instances of the same type of service consumers on the SF SF, for access of another user equipment on any service consumer, when the another user equipment needs to select the same type of service producer, if the validity time of the service discovery result has not expired, the service discovery does not need to be performed by using the NRF, and the service discovery result returned before is directly used. If the validity time has expired, the service discovery needs to be performed again by using the NRF.

It can be learned from the foregoing exemplary descriptions that, the embodiments of this application provide a flexible service-based architecture solution, to implement registration and discovery of the microservices in different communication manners. The SBA solution supporting the hybrid communication loosens constraints imposed on the communication manners of the microservices by the existing service-based architecture solution, and is more helpful in implementing network deployment.

For ease of description, the foregoing method embodiments are stated as a combination of a series of action combinations. However, persons skilled in the art are to know that this application is not limited to the described action sequence, because according to this application, some steps may be performed in another sequence or simultaneously. In addition, persons skilled in the art are also to understand that the embodiments described in this specification are all exemplary embodiments, and the involved actions and modules are not necessarily required to this application.

To better implement the foregoing solutions of the embodiments of this application, related apparatuses for implementing the foregoing solutions are further provided below.

Figure 14:
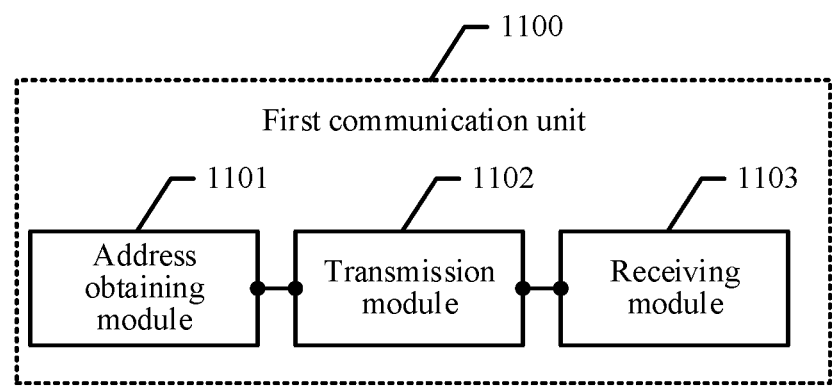
FIG. 14 is a schematic diagram of a composition structure of a first communication unit according to an embodiment of this application.

Referring to FIG. 14, the embodiments of this application provide a communication unit. The communication unit is specifically a first communication unit 1100. The first communication unit 1100 may include: an address obtaining module 1101, a transmission module 1102, and a receiving module 1103.

The address obtaining module 1101 is configured to: obtain a target communication address, the target communication address being a communication address corresponding to a service provided by a first destination service unit that needs to be accessed, the target communication address being provided by a network repository function unit according to a communication manner used by the first destination service unit, when the first destination service unit is a first service unit using an indirect communication manner, a first communication address being a communication address of a first service support unit that provides a service to the first service unit, and when the first destination service unit is a second service unit using a direct communication manner, the first communication address being a communication address of the second service unit.

The transmission module 1102 is configured to transmit a first service access request to the target communication address, the first service access request including a service type of the first destination service unit.

The receiving module 1103 is configured to receive a service access response from the target communication address, the service access response being generated after the first destination service unit provides the service.

In some embodiments of this application, the transmission module 1102 is further configured to: before the address obtaining module obtains the target communication address, transmit a first service registration request to the network repository function unit when the first communication unit is a third service unit, and the third service unit uses the direct communication manner, the first service registration request including: the direct communication manner used by the third service unit and a communication address of the third service unit.

In some embodiments of this application, the address obtaining module 1101 is specifically configured to: transmit a first service discovery request to the network repository function unit, the first service discovery request including: a service type of the first destination service unit that needs to be accessed, the network repository function unit being configured to obtain a communication address of the first destination service unit according to the first service discovery request; and receive a service discovery result transmitted by the network repository function unit, the service discovery result including the target communication address.

Figure 15:
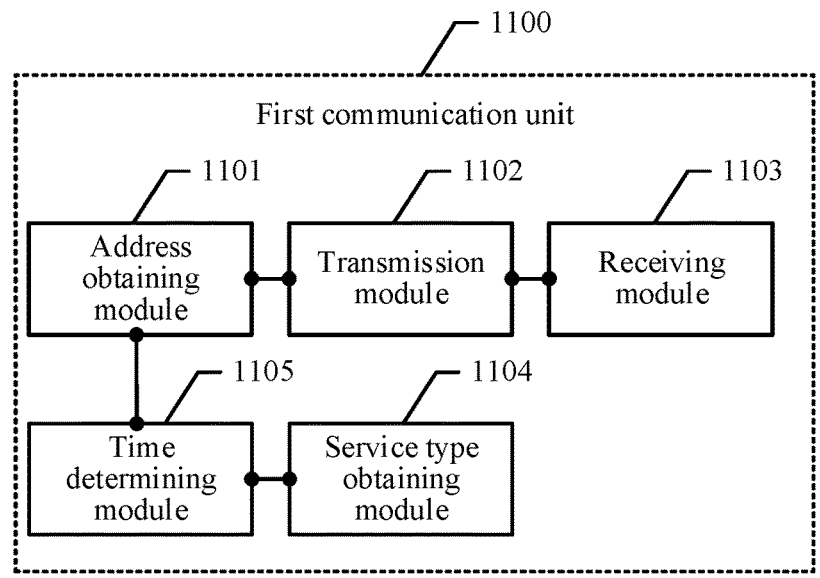
FIG. 15 is a schematic diagram of a composition structure of another first communication unit according to an embodiment of this application.

In some embodiments of this application, as shown in FIG. 15, when the service discovery result further includes: a service discovery validity time, the first communication unit 1100 may further include: a service type obtaining module 1104 and a time determining module 1105.

The service type obtaining module 1104 is configured to obtain a service type of a second destination service unit that needs to be accessed.

The time determining module 1105 is configured to determine, when the service type of the first destination service unit and the service type of the second destination service unit are the same, whether a current time exceeds the service discovery validity time.

The address obtaining module 1101 is further configured to determine, when the current time does not exceed the service discovery validity time, that a communication address corresponding to a service provided by the second destination service unit and the target communication address are the same address.

In some embodiments of this application, the receiving module 1103 is further configured to: before the address obtaining module obtains the target communication address, receive, when the first communication unit is a second service support unit that provides a service to a third service unit, a second service registration request transmitted by the third service unit, the second service registration request including: the indirect communication manner used by the third service unit and a communication address of the third service unit.

The transmission module 1102 is further configured to transmit a third service registration request to the network repository function unit, the third service registration request including: the indirect communication manner used by the third service unit, the communication address of the third service unit, and a communication address of the second service support unit, a communication address corresponding to a service provided by the third service unit being the communication address of the second service support unit.

In some embodiments of this application, the address obtaining module 1101 is specifically configured to: receive a second service access request transmitted by the third service unit, the second service access request including: the service type of the first destination service unit that the third service unit needs to access and service payload data; determine whether the local memory stores the communication address of the service unit corresponding to the service type; and obtain the target communication address from the local memory when the local memory stores the communication address of the service unit corresponding to the service type transmitted by the network repository function unit in advance.

In some embodiments of this application, the address obtaining module 1101 is specifically configured to: transmit a first service discovery request to the network repository function unit when the local memory does not store the communication address of the service unit corresponding to the service type, the first service discovery request including: a service type of the first destination service unit that needs to be accessed, the network repository function unit being configured to obtain a communication address of the first destination service unit according to the first service discovery request; and receive a service discovery result transmitted by the network repository function unit, the service discovery result including the target communication address.

In some embodiments of this application, the transmission module 1102 is further configured to: when the first communication unit is the second service support unit that provides the service to the third service unit, after the receiving module 1103 receives the service access response from the target communication address, transmit the service access response to the third service unit.

Figure 16:
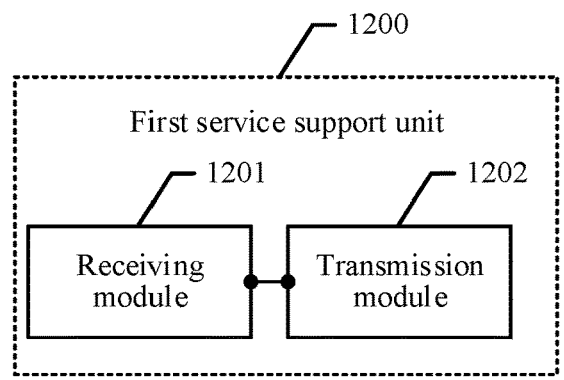
FIG. 16 is a schematic diagram of a composition structure of a first service support unit according to an embodiment of this application.

Referring to FIG. 16, the embodiments of this application provide a service support unit. The service support unit is specifically a first service support unit 1200. The first service support unit 1200 may include: a receiving module 1201 and a transmission module 1202.

The receiving module 1201 is configured to receive a first service access request transmitted by a first communication unit to a target communication address, the first service access request including a service type of a first service unit that needs to be accessed, the first service support unit being a service support unit that provides a service to the first service unit, the first service unit using an indirect communication manner, and the target communication address being a communication address of the first service support unit.

The transmission module 1202 is configured to transmit the first service access request to the first service unit, the first service unit being configured to provide a service according to the first service access request and generate a service access response.

The receiving module 1201 is further configured to receive the service access response transmitted by the first service unit.

The transmission module 1202 is further configured to transmit the service access response to the first communication unit.

In some embodiments of this application, the receiving module 1201 is further configured to: before receiving a first service access request transmitted by a first communication unit to a target communication address, receive a fourth service registration request transmitted by the first service unit, the fourth service registration request including: the indirect communication manner used by the first service unit and a communication address of the first service unit.

The transmission module 1202 is further configured to: transmit a fifth service registration request to a network repository function unit, the fifth service registration request including: the indirect communication manner used by the first service unit, the communication address of the first service unit, and the communication address of the first service support unit.

Figure 17:
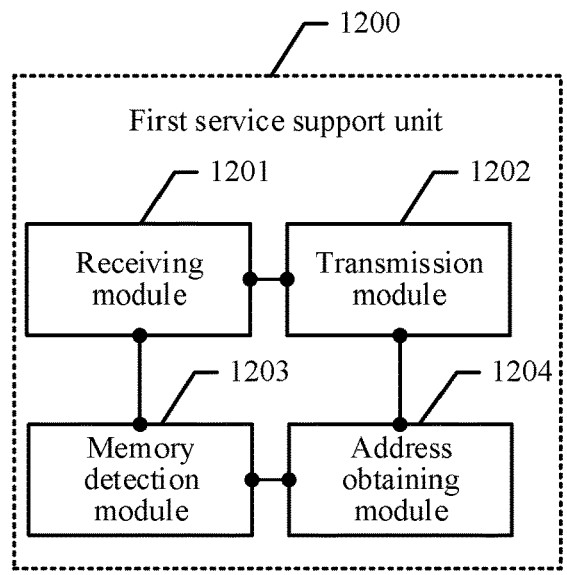
FIG. 17 is a schematic diagram of a composition structure of another first service support unit according to an embodiment of this application.

In some embodiments of this application, as shown in FIG. 17, the first service support unit further includes: a memory detection module 1203 and an address obtaining module 1204. The memory detection module 1203 is configured to determine, before the transmission module 1202 transmits the first service access request to the first service unit, whether a local memory stores a communication address of the first service unit. The address obtaining module 1204 is configured to obtain the communication address of the first service unit from the local memory when the local memory stores the communication address of the first service unit transmitted by the network repository function unit in advance.

In some embodiments of this application, the transmission module 1202 is further configured to transmit a second service discovery request to the network repository function unit when the local memory does not store the communication address of the first service unit, the second service discovery request including the service type of the first service unit. The receiving module 1201 is further configured to: receive a service discovery result transmitted by the network repository function unit, the service discovery result including the communication address of the first service unit. As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs image analysis and/or microscope video stream processing. In practical application, the foregoing functions may be allocated to and completed by different functional modules according to requirements, that is, an inner structure of a device is divided into different functional modules to implement all or a part of the functions described above.

Figure 18:
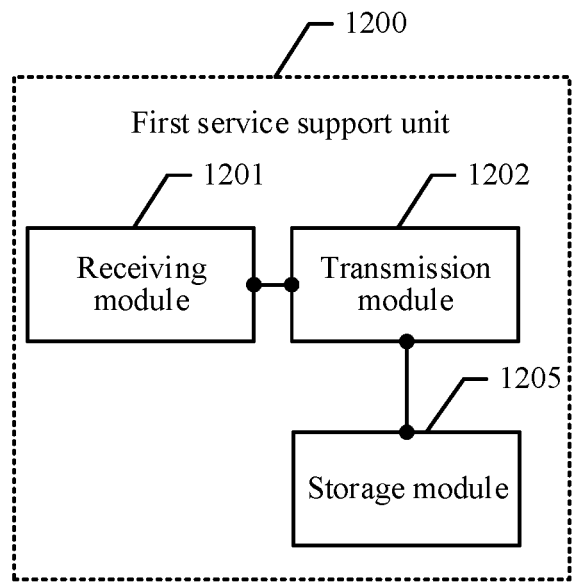
FIG. 18 is a schematic diagram of a composition structure of another first service support unit according to an embodiment of this application.

In some embodiments of this application, as shown in FIG. 18, the first service support unit further includes: a storage module 1205, configured to: after the transmission module 1202 transmits the first service access request to the first service unit, store a binding relationship between the third service unit and the first service unit when the first communication unit is the third service unit, and the third service unit uses the direct communication manner; or store a binding relationship between the second service support unit and the first service unit when the first communication unit is the second service support unit that provides the service to the third service unit.

Figure 19:
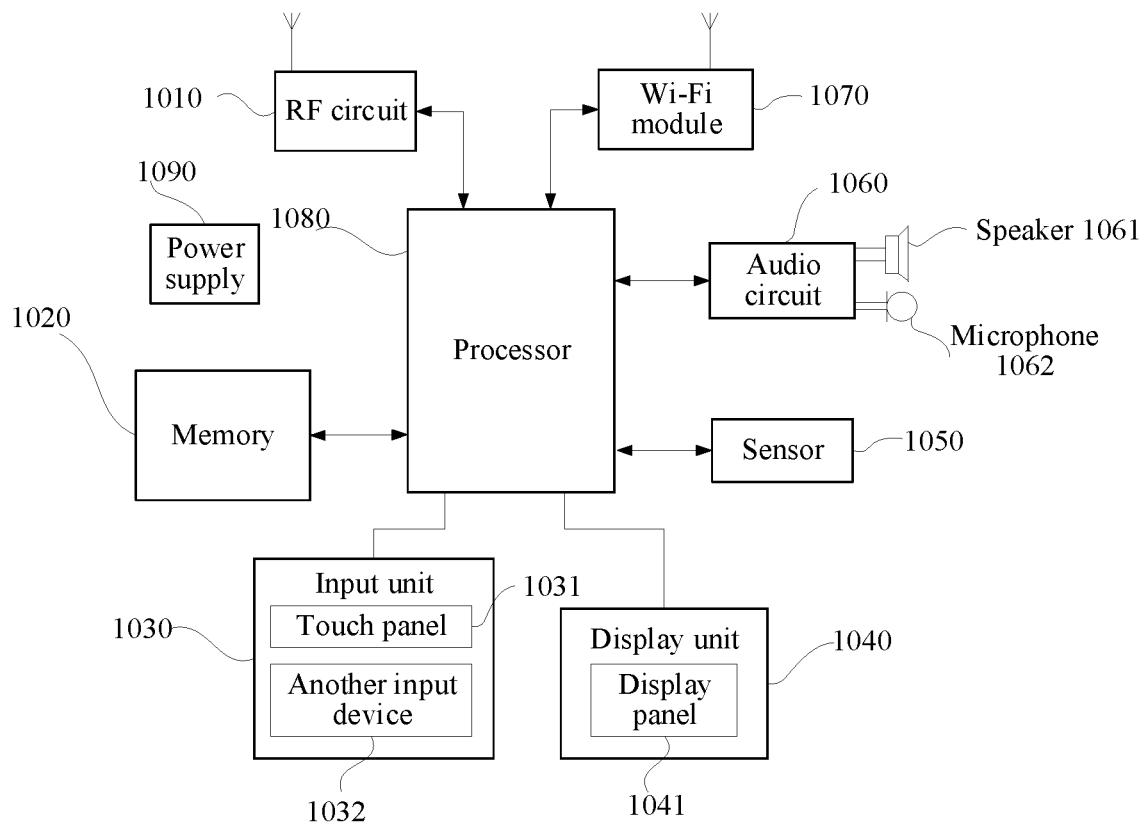
FIG. 19 is a schematic diagram of a composition structure of a terminal to which a service-based communication method is applicable according to an embodiment of this application.

The embodiments of this application further provide a terminal. As shown in FIG. 19, the first communication unit may specifically include the terminal. For ease of description, only parts related to the embodiments of this application are shown. For specific technical details that are not disclosed, refer to the method part of the embodiments of this application. The terminal may be any terminal device, including a mobile phone, a tablet computer, a personal digital assistant (PDA), a point of sales (POS), and an in-vehicle computer. For example, the terminal is a mobile phone. FIG. 19 is a block diagram of a part of a structure of a mobile phone related to a terminal according to an embodiment of this application. Referring to FIG. 19, the mobile phone includes components such as a radio frequency (RF) circuit 1010, a memory 1020, an input unit 1030, a display unit 1040, a sensor 1050, an audio circuit 1060, a wireless fidelity (Wi-Fi) module 1070, a processor 1080, and a power supply 1090. Persons skilled in the art may understand that the structure of the mobile phone shown in FIG. 19 does not constitute a limitation on the mobile phone, and the mobile phone may include more or fewer components than those shown in the figure, or some components may be combined, or a different component deployment may be used. The following makes a specific description of the components of the mobile phone with reference to FIG. 19.

The RF circuit 1010 may be configured to receive and transmit a signal in an information receiving and transmission process or a call process, and in particular, after receiving downlink information of a base station, transmit the downlink information to the processor 1080 for processing. In addition, the RF circuit transmits uplink data to the base station. Generally, the RF circuit 1010 includes, but not limited to, an antenna, at least one amplifier, a transceiver, a coupler, a low noise amplifier (LNA), and a duplexer. In addition, the RF circuit 1010 may also communicate with a network and another device through wireless communication. The wireless communication may use any communication standard or protocol, including, but not limited to, Global system for mobile communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 1020 may be configured to store a software program and module. The processor 1080 runs the software program and module stored in the memory 1020, to implement various functional applications and data processing of the mobile phone. The memory 1020 may mainly include a program storage area and a data storage area.

The input unit 1030 may be configured to receive input digit or character information, and generate a keyboard signal input related to the user setting and function control of the mobile phone. Specifically, the input unit 1030 may include a touch panel 1031 and another input device 1032. The touch panel 1031, which may also be referred to as a touchscreen, may collect a touch operation of a user on or near the touch panel (such as an operation of a user on or near the touch panel 1031 by using any suitable object or accessory such as a finger or a stylus), and drive a corresponding connection apparatus according to a preset program. In some embodiments, the touch panel 1031 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into a contact coordinate, then transmits the contact coordinate to the processor 1080, and receives and executes a command transmitted by the processor 1080.

The display unit 1040 may be configured to display information inputted by the user or information provided for the user, and various menus of the mobile phone. The display unit 1040 may include a display panel 1041. In some embodiments, the display panel 1041 may be configured by using a liquid crystal display (LCD), an organic light-emitting diode (OLED), or the like. Further, the touch panel 1031 may cover the display panel 1041. After detecting a touch operation on or near the touch panel, the touch panel 1031 transfers the touch operation to the processor 1080, to determine a type of a touch event. Then, the processor 1080 provides a corresponding visual output on the display panel 1041 according to the type of the touch event.

The mobile phone may further include at least one sensor 1050 such as an optical sensor, a motion sensor, and other sensors. Specifically, the optical sensor may include an ambient light sensor and a proximity sensor. The ambient light sensor may adjust luminance of the display panel 1041 according to brightness of the ambient light. The proximity sensor may switch off the display panel 1041 and/or backlight when the mobile phone is moved to the ear.

The audio circuit 1060, a speaker 1061, and a microphone 1062 may provide audio interfaces between the user and the mobile phone. The audio circuit 1060 may convert received audio data into an electrical signal and transmit the electrical signal to the speaker 1061. The speaker 1061 converts the electrical signal into a sound signal and outputs the sound signal. In addition, the microphone 1062 converts a collected sound signal into an electrical signal. After receiving the electrical signal, the audio circuit 1060 converts the electrical signal into audio data, and then outputs the audio data. After being processed by the processor 1080, the audio data is transmitted through the RF circuit 1010 to, for example, another mobile phone or the audio data is outputted to the memory 1020 for further processing.

Wi-Fi belongs to a short distance wireless transmission technology. The mobile phone may help, by using the Wi-Fi module 1070, a user to receive and transmit an email, browse a web page, access stream media, and the like. This provides wireless broadband Internet access for the user. Although FIG. 19 shows the Wi-Fi module 1070, it may be understood that the Wi-Fi module is not a necessary component of the mobile phone, and the Wi-Fi module may be omitted as required provided that the scope of the essence of the present disclosure is not changed.

The processor 1080 is a control center of the mobile phone, and is connected to various parts of the entire mobile phone by using various interfaces and lines. By running or executing a software program and/or module stored in the memory 1020, and invoking data stored in the memory 1020, the processor executes various functions of the mobile phone and performs data processing, thereby monitoring the entire mobile phone.

The mobile phone further includes the power supply 1090 (such as a battery) for supplying power to the components. Preferably, the power supply may be logically connected to the processor 1080 by using a power management system, thereby implementing functions such as charging, discharging, and power consumption management by using the power management system. Although not shown in the figure, the mobile phone may further include a camera, a Bluetooth module, and the like. Details are not described herein again.

In this embodiment of this application, the processor 1080 included in the terminal further has the following functions:

obtaining a target communication address, the target communication address being a communication address corresponding to a service provided by a first destination service unit that needs to be accessed, the target communication address being provided by a network repository function unit according to a communication manner used by the first destination service unit, when the first destination service unit is a first service unit using an indirect communication manner, a first communication address being a communication address of a first service support unit that provides a service to the first service unit, and when the first destination service unit is a second service unit using a direct communication manner, the first communication address being a communication address of the second service unit;

transmitting a first service access request to the target communication address, the first service access request including a service type of the first destination service unit; and receiving a service access response from the target communication address, the service access response being generated after the first destination service unit provides the service.

In some embodiments, the processor 1080 is further configured to: transmit a first service registration request to the network repository function unit when the first communication unit is a third service unit, and the third service unit uses the direct communication manner, the first service registration request including: the direct communication manner used by the third service unit and a communication address of the third service unit.

In some embodiments, the processor 1080 is further configured to: transmit a first service discovery request to the network repository function unit, the first service discovery request including: a service type of the first destination service unit that needs to be accessed, the network repository function unit being configured to obtain a communication address of the first destination service unit according to the first service discovery request; and receive a service discovery result transmitted by the network repository function unit, the service discovery result including the target communication address.

In some embodiments, when the service discovery result further includes: a service discovery validity time, the processor 1080 is further configured to: obtain a service type of a second destination service unit that needs to be accessed; determine, when the service type of the first destination service unit and the service type of the second destination service unit are the same, whether a current time exceeds the service discovery validity time; and determine, when the current time does not exceed the service discovery validity time, that a communication address corresponding to a service provided by the second destination service unit and the target communication address are the same address.

In some embodiments, the processor 1080 is further configured to: receive, when the first communication unit is a second service support unit that provides a service to a third service unit, a second service registration request transmitted by the third service unit, the second service registration request including: the indirect communication manner used by the third service unit and a communication address of the third service unit; and transmit a third service registration request to the network repository function unit, the third service registration request including: the indirect communication manner used by the third service unit, the communication address of the third service unit, and a communication address of the second service support unit, a communication address corresponding to a service provided by the third service unit being the communication address of the second service support unit.

In some embodiments, the processor 1080 is further configured to: receive a second service access request transmitted by the third service unit, the second service access request including: the service type of the first destination service unit that the third service unit needs to access and service payload data; determine whether the local memory stores the communication address of the service unit corresponding to the service type; and obtain the target communication address from the local memory when the local memory stores the communication address of the service unit corresponding to the service type transmitted by the network repository function unit in advance.

In some embodiments, the processor 1080 is further configured to: transmit a first service discovery request to the network repository function unit when the local memory does not store the communication address of the service unit corresponding to the service type, the first service discovery request including: a service type of the first destination service unit that needs to be accessed, the network repository function unit being configured to obtain a communication address of the first destination service unit according to the first service discovery request; and receive a service discovery result transmitted by the network repository function unit, the service discovery result including the target communication address.

In some embodiments, the processor 1080 is further configured to transmit the service access response to the third service unit when the first communication unit is the second service support unit that provides the service to the third service unit.

Figure 20:
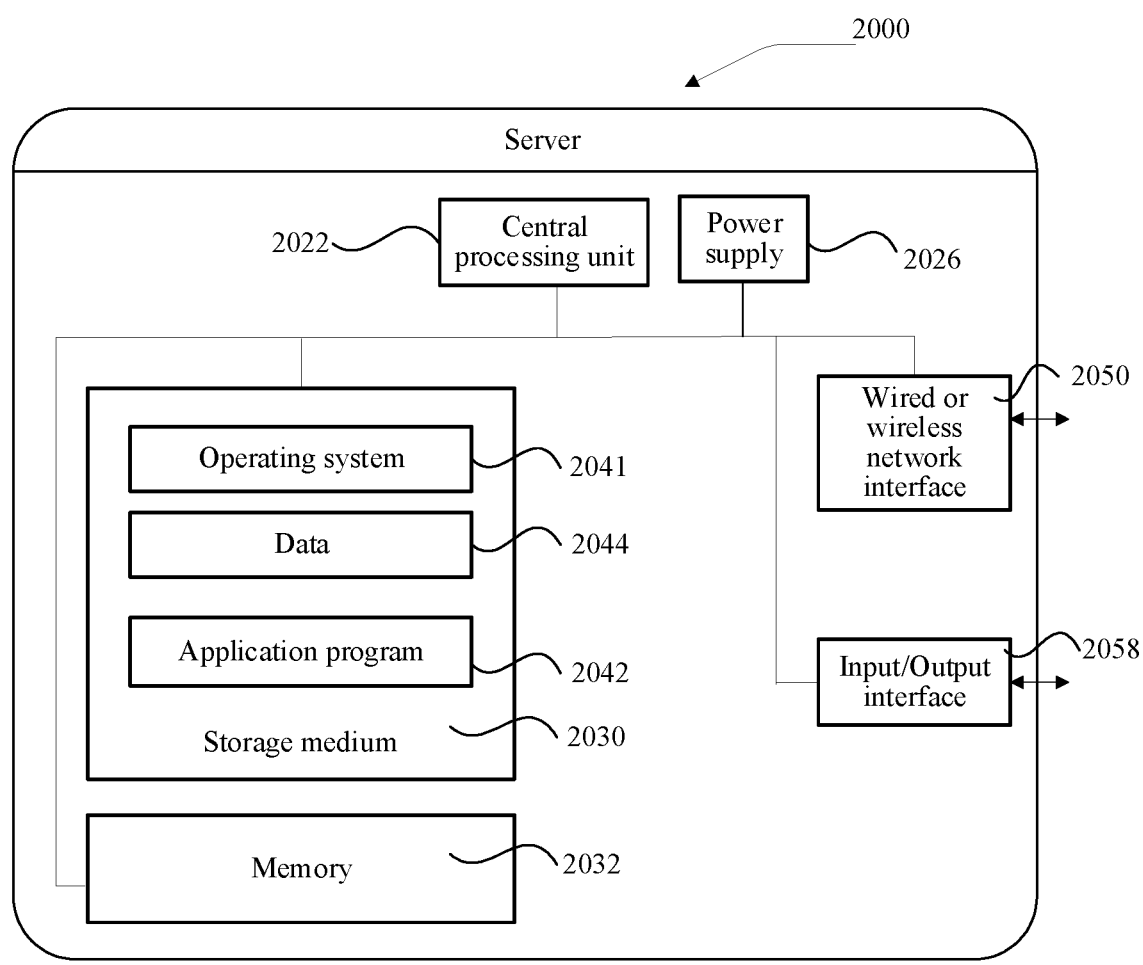
FIG. 20 is a schematic diagram of a composition structure of a server to which a service-based communication method is applicable according to an embodiment of this application.

FIG. 20 is a schematic structural diagram of a server according to an embodiment of this application. The first service support unit may specifically include a server 2000. The server 2000 may vary greatly due to different configurations or performance, and may include one or more central processing units (CPUs) 2022 (for example, one or more processors) and a memory 2032, and one or more storage media 2030 (for example, one or more mass storage devices) that store an application program 2042 or data 2044. The memory 2032 and the storage medium 2030 may be transient storage or permanent storage. A program stored in the storage medium 2030 may include one or more modules (not marked in the figure), and each module may include a series of instruction operations on the server. Further, the CPU 2022 may be configured to communicate with the storage medium 2030, and perform, on the server 2000, the series of instruction operations in the storage medium 2030. The server 2000 may further include one or more power supplies 2026, one or more wired or wireless network interfaces 2050, one or more input/output interfaces 2058, and/or one or more operating systems 2041 such as Windows Server™, Mac OS X™, Unix™, Linux™, or FreeBSD™.

The steps of the service-based communication method performed by the server in the foregoing embodiments may be based on the server structure shown in FIG. 20.

In this embodiment of this application, the processor 2022 included in the server further has the following functions:
receiving a first service access request transmitted by a first communication unit to a target communication address, the first service access request including a service type of a first service unit that needs to be accessed, the first service support unit being a service support unit that provides a service to the first service unit, the first service unit using an indirect communication manner, and the target communication address being a communication address of the first service support unit;
transmitting the first service access request to the first service unit, the first service unit being configured to provide a service according to the first service access request and generate a service access response;
receiving the service access response transmitted by the first service unit; and
transmitting the service access response to the first communication unit.

In some embodiments, the processor 2022 is further configured to: receive a fourth service registration request transmitted by the first service unit, the fourth service registration request including: the indirect communication manner used by the first service unit and a communication address of the first service unit; and transmit a fifth service registration request to a network repository function unit, the fifth service registration request including: the indirect communication manner used by the first service unit, the communication address of the first service unit, and the communication address of the first service support unit.

In some embodiments, the processor 2022 is further configured to: determine whether a local memory stores a communication address of the first service unit; and obtain the communication address of the first service unit from the local memory when the local memory stores the communication address of the first service unit transmitted by the network repository function unit in advance.

In some embodiments, the processor 2022 is further configured to: transmit a second service discovery request to the network repository function unit when the local memory does not store the communication address of the first service unit, the second service discovery request including the service type of the first service unit; and receive a service discovery result transmitted by the network repository function unit, the service discovery result including the communication address of the first service unit.

In addition, the described apparatus embodiment is merely exemplary. The units described as separate parts may or may not be physically separate, and parts displayed as units may or may not be physical units, may be located in one position, or may be distributed on multiple network units. Some or all of the modules may be selected according to needs to achieve the objectives of the solutions of the embodiments.

In summary, the foregoing embodiments are merely intended for describing the technical solutions of this application, but not for limiting this application. Although this application is described in detail with reference to the foregoing embodiments, persons of ordinary skill in the art understand that they may still make modifications to the technical solutions described in the foregoing embodiments or make equivalent replacements to some technical features thereof, without departing from the spirit and scope of the technical solutions of the embodiments of this application.

In an embodiment of this application, a computer-readable storage medium such as a memory including instructions, applicable to a server, is further provided, and the instructions may be executed by a processor to complete the service-based communication method in the foregoing embodiments. For example, the computer-readable storage medium may be a read-only memory (ROM), a random access memory (random-access memory, RAM), a compact disc read-only memory (CD-ROM), a magnetic tape, a floppy disk, an optical data storage device, and the like.

What is claimed is:

1. A service-based communication method performed at a computing device acting as a first communication unit, comprising:
obtaining, by the first communication unit, a target communication address through an interaction with a network repository function unit in a service framework, the target communication address being a first communication address corresponding to a service provided by a first destination service unit that needs to be accessed, the target communication address being provided by the network repository function unit according to a communication manner used by the first destination service unit, wherein
the service framework supports services deployed in a direct communication manner and services deployed in an indirect communication manner, both through communication with the network repository function unit in the service framework, when the first destination service unit is a first service unit using the indirect communication manner, the target communication address is a communication address of a first service support unit that provides a service to the first service unit, and when the first destination service unit is a second service unit using the direct communication manner, the target communication address is a communication address of the second service unit;

transmitting, by the first communication unit, a first service access request to the target communication address, the first service access request comprising a service type of the first destination service unit; and receiving, by the first communication unit, a service access response from the target communication address, the service access response being generated after the first destination service unit provides the service.

2. The method according to claim 1, wherein before the obtaining, by a first communication unit, a target communication address, the method further comprises:

transmitting, by the first communication unit, a first service registration request to the network repository function unit when the first communication unit is a third service unit, and the third service unit uses the direct communication manner, the first service registration request comprising: the direct communication manner used by the third service unit and a communication address of the third service unit.

3. The method according to claim 1, wherein the obtaining, by a first communication unit, a target communication address comprises:

transmitting, by the first communication unit, a first service discovery request to the network repository function unit, the first service discovery request comprising: the service type of the first destination service unit that needs to be accessed, the network repository function unit being configured to obtain a communication address of the first destination service unit according to the first service discovery request; and receiving, by the first communication unit, a service discovery result transmitted by the network repository function unit, the service discovery result comprising the target communication address.

4. The method according to claim 3, wherein when the service discovery result further comprises: a service discovery validity time, the method further comprises:

obtaining, by the first communication unit, a service type of a second destination service unit that needs to be accessed;

determining, by the first communication unit when the service type of the first destination service unit and the service type of the second destination service unit are the same, whether a current time exceeds the service discovery validity time; and determining, by the first communication unit when the current time does not exceed the service discovery validity time, that a communication address corresponding to a service provided by the second destination service unit and the target communication address are the same address.

5. The method according to claim 1, wherein before the obtaining a target communication address, the method further comprises:

receiving, by the first communication unit when the first communication unit is a second service support unit that provides a service to a third service unit, a second service registration request transmitted by the third service unit, the second service registration request comprising: the indirect communication manner used by the third service unit and a communication address of the third service unit; and transmitting, by the first communication unit, a third service registration request to the network repository function unit, the third service registration request comprising: the indirect communication manner used by the third service unit, the communication address of the third service unit, and a communication address of the second service support unit, a communication address corresponding to a service provided by the third service unit being the communication address of the second service support unit.

6. The method according to claim 5, wherein the obtaining, by a first communication unit, a target communication address comprises:

receiving, by the first communication unit, a second service access request transmitted by the third service unit, the second service access request comprising: the service type of the first destination service unit that the third service unit needs to access and service payload data;

determining, by the first communication unit, whether a local memory stores a communication address of a service unit corresponding to the service type; and obtaining, by the first communication unit, the target communication address from the local memory when the local memory stores the communication address of the service unit corresponding to the service type transmitted by the network repository function unit in advance.

7. The method according to claim 6, wherein the obtaining the target communication address further comprises:

transmitting a first service discovery request to the network repository function unit when the local memory does not store the communication address of the service unit corresponding to the service type, the first service discovery request comprising: the service type of the first destination service unit that needs to be accessed, the network repository function unit being configured to obtain a communication address of the first destination service unit according to the first service discovery request; and receiving, by the first communication unit, a service discovery result transmitted by the network repository function unit, the service discovery result comprising the target communication address.

8. The method according to claim 5, wherein after the receiving a service access response from the target communication address when the first communication unit is a second service support unit that provides a service to a third service unit, the method further comprises:

transmitting, by the first communication unit, the service access response to the third service unit.

9. A computing device acting as a first communication unit, the computing device comprising: a processor and a memory, the memory being configured to store instructions; and the processor, when executing the instructions, being configured to:

obtain a target communication address through an interaction with a network repository function unit in a service framework, the target communication address being a first communication address corresponding to a service provided by a first destination service unit that needs to be accessed, the target communication address being provided by the network repository function unit according to a communication manner used by the first destination service unit, wherein
- the service framework supports services deployed in a direct communication manner and services deployed in an indirect communication manner, both through communication with the network repository function unit in the service framework,
- when the first destination service unit is a first service unit using the indirect communication manner, the target communication address is a communication address of a first service support unit that provides a service to the first service unit, and
- when the first destination service unit is a second service unit using the direct communication manner, the target communication address is a communication address of the second service unit;
- transmit a first service access request to the target communication address, the first service access request comprising a service type of the first destination service unit; and
- receive a service access response from the target communication address, the service access response being generated after the first destination service unit provides the service.

10. The computing device according to claim 9, wherein the processor is further configured to: transmit a first service registration request to the network repository function unit when the first communication unit is a third service unit, and the third service unit uses the direct communication manner, the first service registration request comprising: the direct communication manner used by the third service unit and a communication address of the third service unit.

11. The computing device according to claim 9, wherein the processor is further configured to:
- transmit a first service discovery request to the network repository function unit, the first service discovery request comprising: the service type of the first destination service unit that needs to be accessed, the network repository function unit being configured to obtain a communication address of the first destination service unit according to the first service discovery request; and
- receive a service discovery result transmitted by the network repository function unit, the service discovery result comprising the target communication address.

12. The computing device according to claim 11, wherein when the service discovery result further comprises: a service discovery validity time, the processor is further configured to:
- obtain a service type of a second destination service unit that needs to be accessed;
- determine, when the service type of the first destination service unit and the service type of the second destination service unit are the same, whether a current time exceeds the service discovery validity time; and
- determine, when the current time does not exceed the service discovery validity time, that a communication address corresponding to a service provided by the second destination service unit and the target communication address are the same address.

13. The computing device according to claim 9, wherein the processor is further configured to:
- receive, when the first communication unit is a second service support unit that provides a service to a third service unit, a second service registration request transmitted by the third service unit, the second service registration request comprising: the indirect communication manner used by the third service unit and a communication address of the third service unit; and
- transmit a third service registration request to the network repository function unit, the third service registration request comprising: the indirect communication manner used by the third service unit, the communication address of the third service unit, and a communication address of the second service support unit, a communication address corresponding to a service provided by the third service unit being the communication address of the second service support unit.

14. The computing device according to claim 13, wherein the processor is further configured to:
- receive a second service access request transmitted by the third service unit, the second service access request comprising: the service type of the first destination service unit that the third service unit needs to access and service payload data;
- determine whether a local memory stores a communication address of a service unit corresponding to the service type; and
- obtain the target communication address from the local memory when the local memory stores the communication address of the service unit corresponding to the service type transmitted by the network repository function unit in advance.

15. The computing device according to claim 14, wherein the processor is further configured to:
- transmit a first service discovery request to the network repository function unit when the local memory does not store the communication address of the service unit corresponding to the service type, the first service discovery request comprising: the service type of the first destination service unit that needs to be accessed, the network repository function unit being configured to obtain a communication address of the first destination service unit according to the first service discovery request; and
- receive a service discovery result transmitted by the network repository function unit, the service discovery result comprising the target communication address.

16. The computing device according to claim 13, wherein the processor is further configured to transmit the service access response to the third service unit.

17. A non-transitory computer-readable storage medium, storing instructions that, when being executed by a processor of a computing device acting as a first communication unit, cause the first communication unit to performing a plurality of operations including:
- obtaining, by the first communication unit, a target communication address through an interaction with a network repository function unit in a service framework, the target communication address being a first communication address corresponding to a service provided by a first destination service unit that needs to be accessed, the target communication address being provided by the network repository function unit according to a communication manner used by the first destination service unit, wherein the service framework supports services deployed in a direct communication manner and services deployed in an indirect communication manner, both through communication with the network repository function unit in the service framework, when the first destination service unit is a first service unit using the indirect communication manner, the target communication address is a communication address of a first service support unit that provides a service to the first service unit, and when the first destination service unit is a second service unit using the direct communication manner, the target communication address is a communication address of the second service unit;

transmitting, by the first communication unit, a first service access request to the target communication address, the first service access request comprising a service type of the first destination service unit; and receiving, by the first communication unit, a service access response from the target communication address, the service access response being generated after the first destination service unit provides the service.

18. The non-transitory computer-readable storage medium according to claim 17, wherein the plurality of operations further comprise:

transmitting, by the first communication unit, a first service registration request to the network repository function unit when the first communication unit is a third service unit, and the third service unit uses the direct communication manner, the first service registration request comprising: the direct communication manner used by the third service unit and a communication address of the third service unit.

19. The non-transitory computer-readable storage medium according to claim 17, wherein the obtaining, by a first communication unit, a target communication address comprises:

transmitting, by the first communication unit, a first service discovery request to the network repository function unit, the first service discovery request comprising: the service type of the first destination service unit that needs to be accessed, the network repository function unit being configured to obtain a communication address of the first destination service unit according to the first service discovery request; and receiving, by the first communication unit, a service discovery result transmitted by the network repository function unit, the service discovery result comprising the target communication address.

20. The non-transitory computer-readable storage medium according to claim 17, wherein the plurality of operations further comprise:

receiving, by the first communication unit when the first communication unit is a second service support unit that provides a service to a third service unit, a second service registration request transmitted by the third service unit, the second service registration request comprising: the indirect communication manner used by the third service unit and a communication address of the third service unit; and transmitting, by the first communication unit, a third service registration request to the network repository function unit, the third service registration request comprising: the indirect communication manner used by the third service unit, the communication address of the third service unit, and a communication address of the second service support unit, a communication address corresponding to a service provided by the third service unit being the communication address of the second service support unit.

* * * * *